SEQUENCE "A"

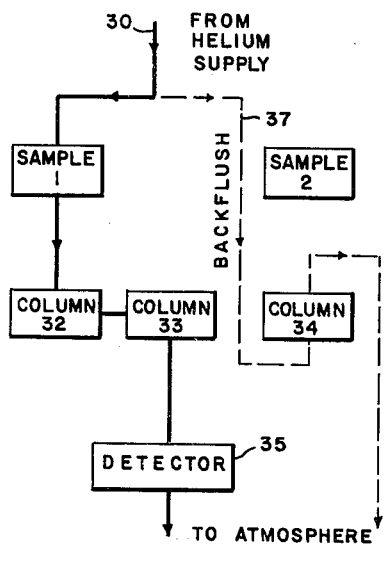
SEQUENCE "A"
Fig. 1.
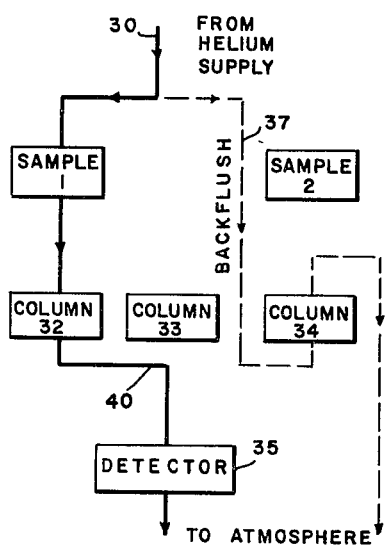
SEQUENCE "B"
Fig. 2.
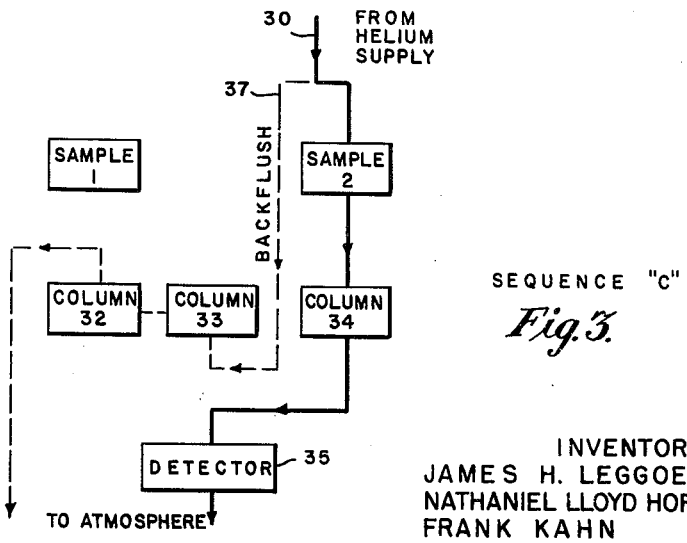
SEQUENCE "C"
Fig. 3.
INVENTORS
JAMES H. LEGGOE
NATHANIEL LLOYD HOFFMAN
FRANK KAHN
JAMES EDWARD BREWER
BY
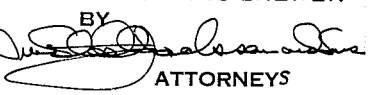
ATTORNEYS Sept. 21, 1965 J. H. LEGGOE ET AL 3,206,968
GAS CHROMATOGRAPHY
Filed March 10, 1961 10 Sheets-Sheet 2

SEQUENCE "B"

INVENTORS
JAMES H. LEGGOE
NATHANIEL LLOYD HOFFMAN
FRANK KAHN
JAMES EDWARD BREWER
BY
ATTORNEYS

SEQUENCE "C"

INVENTORS
JAMES H. LEGGOE
NATHANIEL LLOYD HOFFMAN
FRANK KAHN
JAMES EDWARD BREWER
BY
ATTORNEYS

Sept. 21, 1965  J. H. LEGGOE ET AL  3,206,968
GAS CHROMATOGRAPHY
Filed March 10, 1961  10 Sheets-Sheet 8
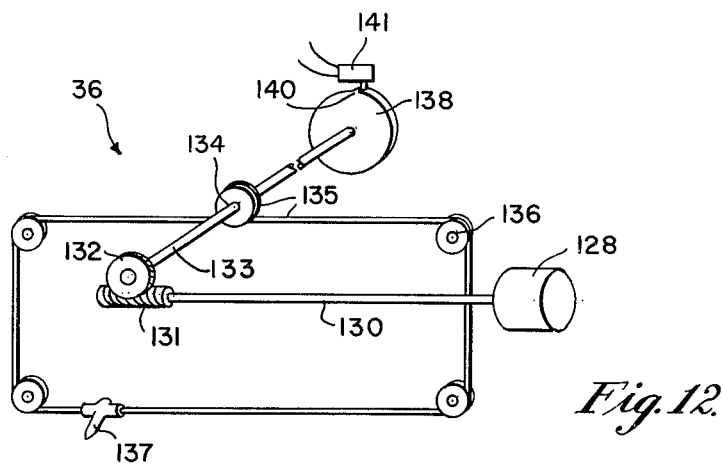
Fig. 12.
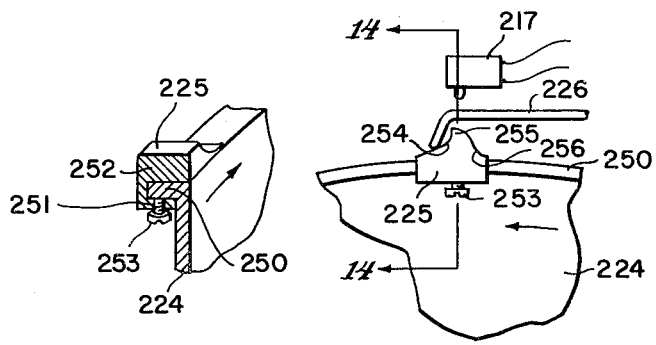
Fig. 14.  Fig. 13.
INVENTORS
JAMES H. LEGGOE
NATHANIEL LLOYD HOFFMAN
FRANK KAHN
JAMES EDWARD BREWER
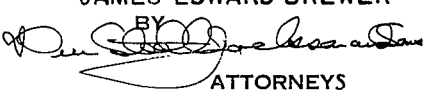
ATTORNEYS INVENTORS
JAMES H. LEGGOE
NATHANIEL LLOYD HOFFMAN
FRANK KAHN
JAMES EDWARD BREWER
BY
ATTORNEYS Sept. 21, 1965 J. H. LEGGOE ET AL 3,206,968
GAS CHROMATOGRAPHY
Filed March 10, 1961 10 Sheets-Sheet 10
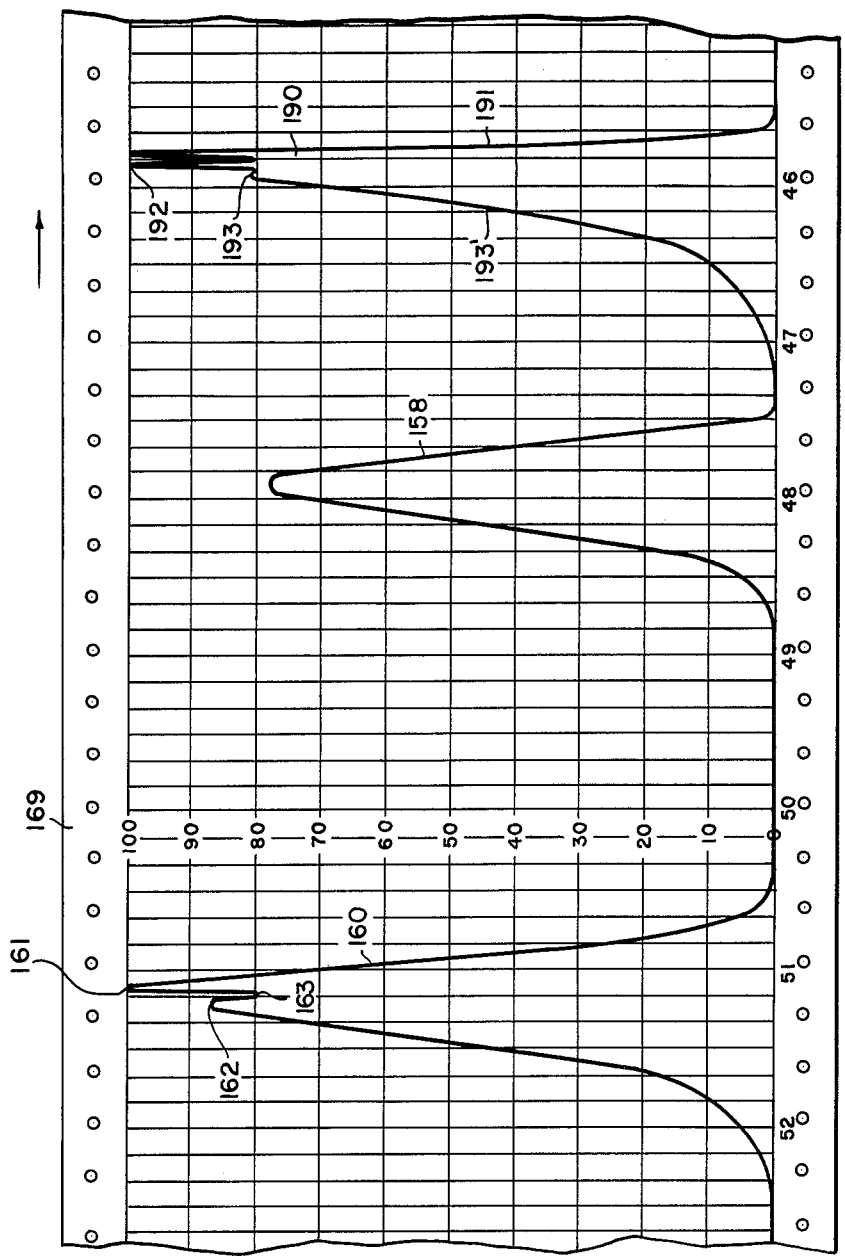
Fig. 16.
INVENTORS
JAMES H. LEGGOE
NATHANIEL LLOYD HOFFMAN
FRANK KAHN
JAMES EDWARD BREWER
BY 
ATTORNEYS 3,206,968
GAS CHROMATOGRAPHY
James H. Leggoe, 706 Manor Terrace, Morrestown, N.J., and Nathaniel Lloyd Hoffman, 1590 Daws Road, Norristown, Frank Kahn, 1865 Edmund Road, Abington, and James Edward Brewer, Norristown, Pa.; said Brewer assignor to said Leggoe, said Hoffman, and said Kahn
Filed Mar. 10, 1961, Ser. No. 94,865
44 Claims. (Cl. 73—23.1)

The present invention relates to chromatographic analysis of gases.

A purpose of the invention is to permit individual discrimination between carbon dioxide and propane in the presence of a mixture of ethane and ethylene in gas chromatography using a single detector and a single trace.

A further purpose is to permit individual discrimination of both propylene and iso-butane in the presence of a mixture of ethane and ethylene in gas chromatography using a single detector and a single trace.

A further purpose is to quantitatively analyze for a wide variety of gases to a high degree of accuracy using gas chromatography and plotting a single trace and employing a single detector.

A further purpose is to reduce the amount of manipulation required in gas chromatography and eliminate the need for highly skilled personnel.

A further purpose is to make an independent quantitative determination of each component in a sample for gas chromatography so that there will be no accumulation of errors. When a peak is produced on the recorder trace for one important gas component, no other component is present in the detector.

A further purpose is to secure definitely separated peaks on a single trace for important gas components in gas chromatography.

A further purpose is to permit the completion of a complete analysis for a gas mixture including hydrocarbons up to and through the butanes within an elapsed time of the order of one hour and to high accuracy.

A further purpose is to produce a gas chromatography device which is readily stabilized and remains stable without frequent calibrations.

A further purpose is to inject a first sample of the unknown gas into a carrier gas stream and pass said carrier gas stream through an adsorption column and then through a molecular sieve column and record the fixed gas components on a single trace on a recorder, next to pass the ethane, carbon dioxide and ethylene in the first sample directly from the adsorption column and record them on the same trace, and finally to inject a second sample of the unknown gas into the carrier gas stream and pass said stream containing said second sample into a liquid phase partition column and record higher hydrocarbons of said second sample on said same trace.

A further purpose is to inject a sample containing higher hydrocarbons into a carrier gas and pass said carrier gas through a column which contains adsorbed on inert particules, both a thiophan sulfone and a di-alkyl-ester of an aliphatic diabasic acid containing between 12 and 42 carbon atoms, so as to discriminate in the presence of ethane and ethylene between carbon dioxide and propane and between propylene and iso-butane.

A further purpose is to adjust the flow resistance of the adsorption column and the molecular sieve column in series, of the adsorption column alone by by-passing the molecular sieve column, and of the liquid phase partition column alone so that the flow resistance in each case will be identical.

A further purpose is to backflush a molecular sieve column and an adsorption column by directing the carrier gas first through the molecular sieve column and then through the adsorption column.

A further purpose is to accomplish the backflushing of the adsorption column, the molecular sieve column and the liquid phase partition column respectively while others of these columns are in use in analyzing unknown samples and without interruption in the analytical procedure, the columns being completely backflushed and ready for use when they are required in the next cycle.

A further purpose is to separate gaseous components in a carrier gas flow circuit by three columns, an adsorption column, a molecular sieve column and a liquid phase partition column, and to successively place the adsorption column and the molecular sieve column in series, then by-pass the molecular sieve column, and then introduce the liquid phase partition column into the carrier gas path by two sets of valves, one of which controls flow to and from the columns and the other of which controls by-passing of the molecular sieve column.

A further purpose is to control backflushing of the columns by ports in said sets of valves, so that when any column or group of columns is placed on stream another column or other columns are placed on backflush.

A further purpose is to provide a plurality of compartments in a metering valve, and to utilize a particular compartment for metering and then for automatically injecting the metered sample into the carrier gas stream.

A further purpose is to permit metering with a first metering valve chamber while the carrier gas stream is flowing uninterruptedly through a second metering valve chamber and then to shift the metering valve to another position at which the contents of the first chamber are injected ino the carrier gas stream and in which the carrier gas stream continues to flow through the second chamber (or through another chamber).

A further purpose is to provide a plurality of gas chambers in a metering valve, one of which is in metering position while another is in the carrier gas stream, and selectively as the valve position changes meter gas in one chamber and inject gas from the other chamber into the carrier gas stream and conduct the carrier gas stream therethrough.

A further purpose is to provide a valve having a valve rotor with a plurality of metering loops in the rotor, to extend cooperating ports to said loops from one side face of the rotor and to seal the rotor against said ports by urging the rotor axially toward the ports.

A further purpose is to assure timer controlled instantaneous release and re-engagement of ratchet means controlling the release of a torque motor in order to permit snap action partial rotation of a sampling valve rotor.

A further purpose is to drive the rotor of a metering valve provided with metering chambers and cooperating ports, by means of a torque motor connected to the rotor, and ratchet means which stops the advance of the rotor when it has turned through a predetermined fraction of a revolution, and to accomplish further advance at predetermined times by detent release of the ratchet.

A further purpose is to release the ratchet detent instananeously so that it will function at the next tooth of the ratchet.

A further purpose is to provide a detector having thermal conductivity cells in two analyzing arms of a Wheatstone bridge, having standard resistors in the two other arms of the Wheatstone bridge and having a source of energizing voltage (suitably D.C.) connected across the bridge and having an output circuit for the bridge connected to a recorder, and to introduce in the output circuit of the bridge a counter E.M.F. (suitably D.C.) which will maintain the output of the bridge at zero current after the device becomes stabilized, when it is desired to make a zero indication on the recorder.

A further purpose is to determine the level of the counter E.M.F. by introducing a high resistance sensitive voltmeter across an open portion of the output circuit and to adjust the counter E.M.F. introduced at another point in the output circuit until the voltmeter reads zero and then to close the open portion of the circuit shunting the voltmeter.

A further purpose is a recorder responsive to a Wheatstone bridge output current in which a counter E.M.F. is introduced in series with the Wheatstone bridge output circuit to maintain the output current and the recorder at zero when the Wheatstone bridge is stabilized in inactive condition.

A further purpose is to readjust the sensitivity of the recorder as the recorder stylus approaches within a predetermined distance from maximum scale position.

A further purpose is to readjust the sensitivity of the recorder successively each time the recorder stylus approaches within a predetermined distance from maximum scale position.

A further purpose is to pre-select a recorder sensitivity for a given time on the recorder chart and to pre-select other different sensitivities for other different times along the chart.

A further purpose is to pre-select a recorder base sensitivity for a given time along the recorder chart and then to further readjust the recorder sensitivity each time the recorder stylus approaches within a predetermined distance from the maximum scale value.

A further purpose is to provide for each of a plurality of different time intervals along a recorder chart a base recorder sensitivity and to superimpose on that base recorder sensitivity where required additional sensitivity adjustments when the recorder stylus approaches full scale. The final sensitivity can readily be determined by adding to the base sensitivity the number of additional peaks on the chart.

A further purpose is to print a sensitivity step number on the recorder chart adjacent the trace for the final sensitivity step.

A further purpose is to adjust the time intervals for which different base sensitivity levels are set on the recorder.

A further purpose is to advance a sensitivity preset control step by step for a predetermined number of steps which establishes the base sensitivity, to concurrently adjust the recorder sensitivity in step with the advance of the sensitivity preset control, and thus to establish the recorder base sensitivity for a particular time interval at a predetermined value.

A further purpose is to provide sensitivity preset controls for each of a plurality of components in an unknown gas and to energize a particular sensitivity preset control at a time prior to the time at which a hump for that gas component will register on the recorded, and then to shift to a succeeding sensitivity preset control after the particular hump has passed.

A further purpose is to advance a gang switch driven by timing means to select the particular sensitivity preset control which is to be energized at a particular time interval.

A further purpose is to drive a series of sequence control switches by a single timer, which switches shift from onstream connection to backflush connection a plurality of gas differentiating columns, and by sequence control switch means driven by the same timer to establish also recorder sensitivities for the different gases prior to the time they reach the detector.

A further purpose, starting with an adsorption column and a molecular sieve column connected in series, is to automatically measure a first unknown gas sample and inject it into a carrier gas stream, to pass the carrier gas stream through the adsorption column and the molecular sieve column in series in that order, to preset various sensitivities of a recorder at timed intervals prior to the arrival of the individual fixed gas components at a detection point to which the recorder is responsive, to connect the flow of the carrier gas stream directly from the adsorption column to the detection point, automatically in response to timer control to preset the sensitivity of the recorder successively to different values prior to the time that ethane, carbon dioxide and ethylene components arrive at the detection point, to measure a second unknown gas sample and automatically under timer control to introduce it into the carrier gas stream and divert the carrier gas stream containing the second sample into a liquid phase partition column, automatically under timer control to preset the sensitivity of the recorder to successive values for successive higher hydrocarbon components beginning with ethane prior to the time that said successive higher hydrocarbon components reach said detection point, and then to automatically re-set for the next cycle.

A further purpose is to provide novel means for stopping the timer motor at the end of the cycle and starting the timer motor at the beginning of a new cycle by inertial switching action.

A further purpose is to provide instantaneous stopping by a timer-controlled switch circuit which in itself stops the operation of the timer and permits instantaneous restarting.

A further purpose is to premit manual re-setting of a timer-controlled series of switches to any particular point of the timer cycle, and manual restarting any time in the cycle.

Further purposes appear in the specification and in the claims.

In the drawings we have chosen to illustrate a few only of the numerous embodiments in which the invention may appear, selecting the form shown from the standpoints of convenience in illustration, satisfactory operation and clear demonstration of the principles involved.

FIGURE 1 is a diagram of the chromatograph of the invention, at sequence A.

FIGURE 2 is a diagram of the chromatograph of the invention at sequence B.

FIGURE 3 is a diagram of the chromatograph of the invention at sequence C.

Figure 7:
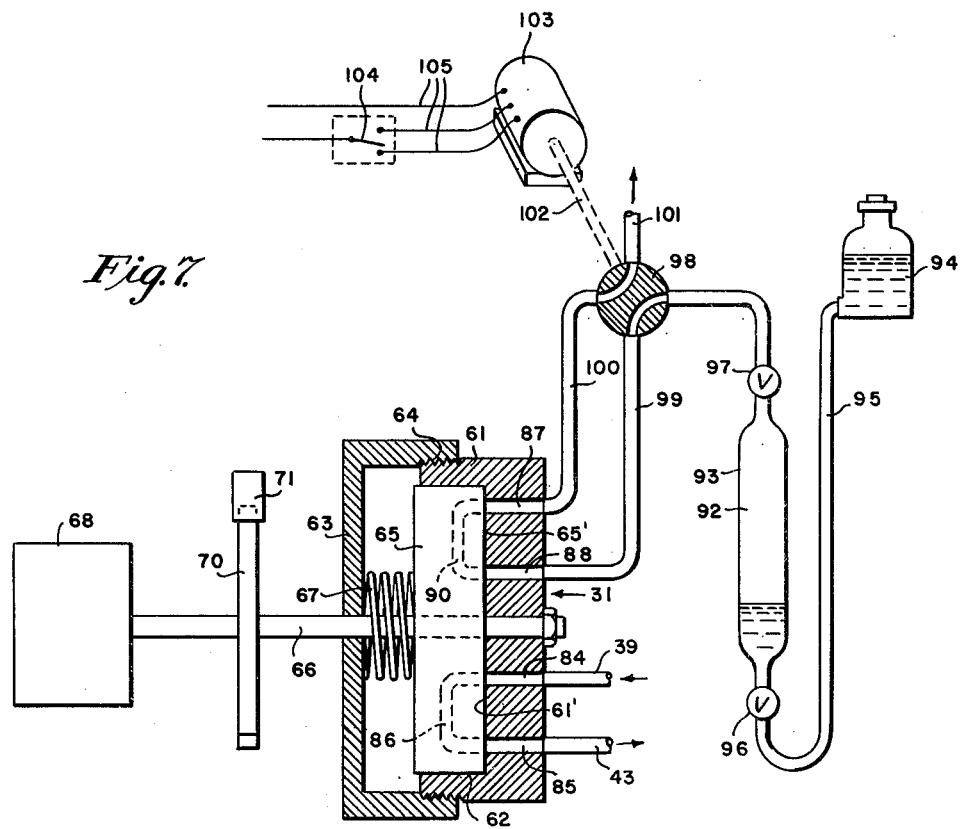
FIGURE 7 is a diagrammatic perspective partially in section showing the sample metering apparatus employed.
Figures 8, 9:
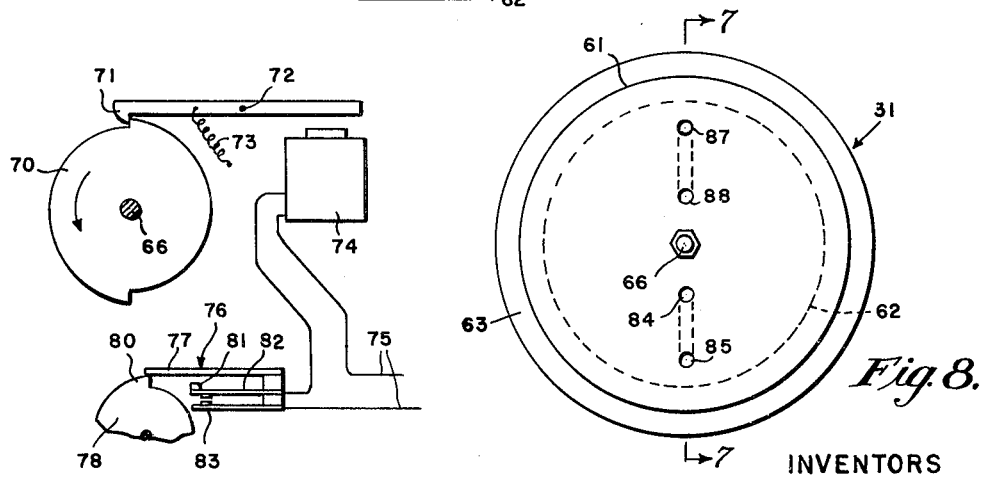

The section of the sample metering valve in FIGURE 7 is taken on the line 7—7 of FIGURE 8.

FIGURE 8 is a front elevation of the sample metering valve of FIGURE 7.

FIGURE 9 is a diagrammatic fragmentary front elevation of the mechanism for operating the sample metering valve.

Figure 10:
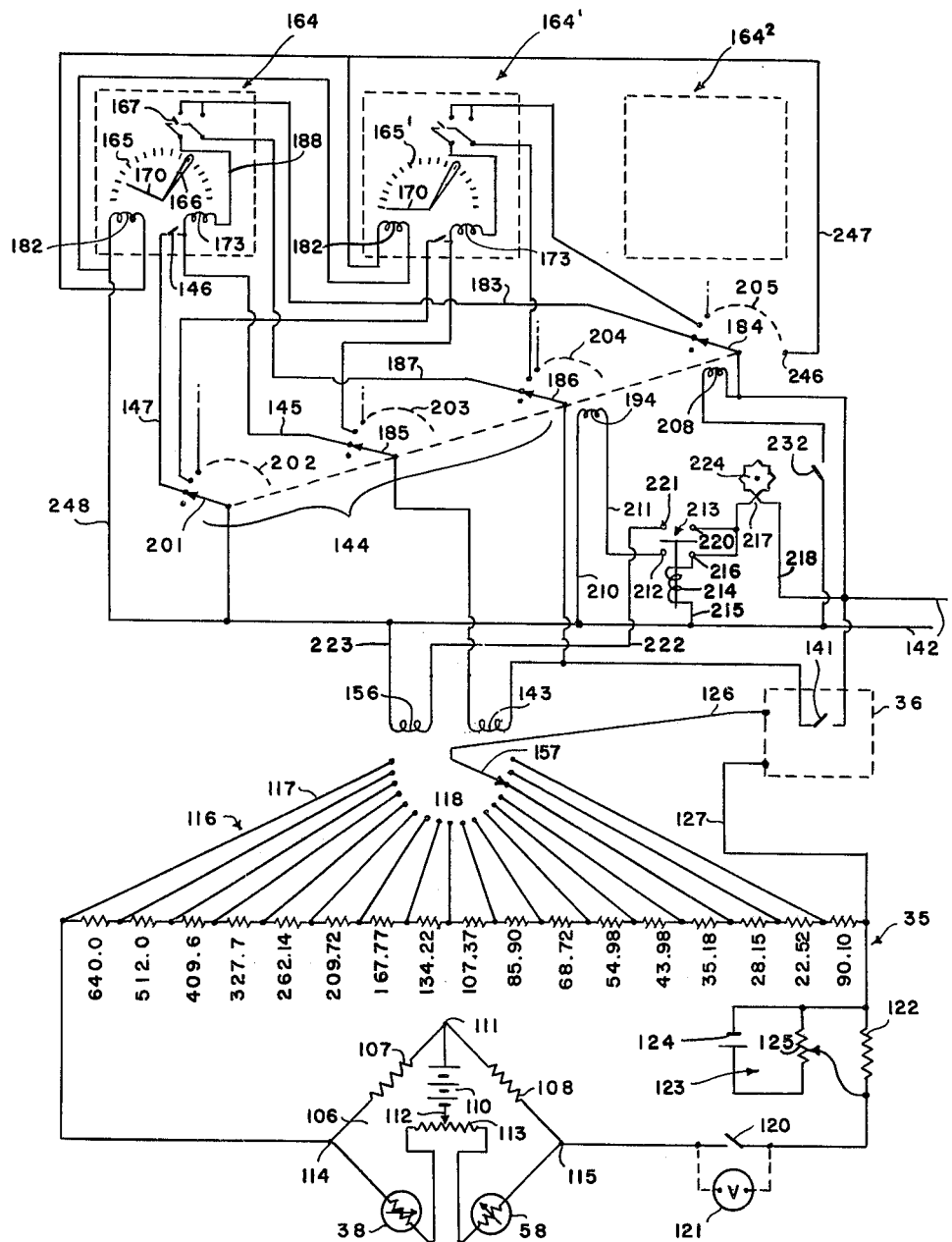

FIGURE 10 is a circuit diagram of the detector and sensitivity control of the invention.

Figure 11:
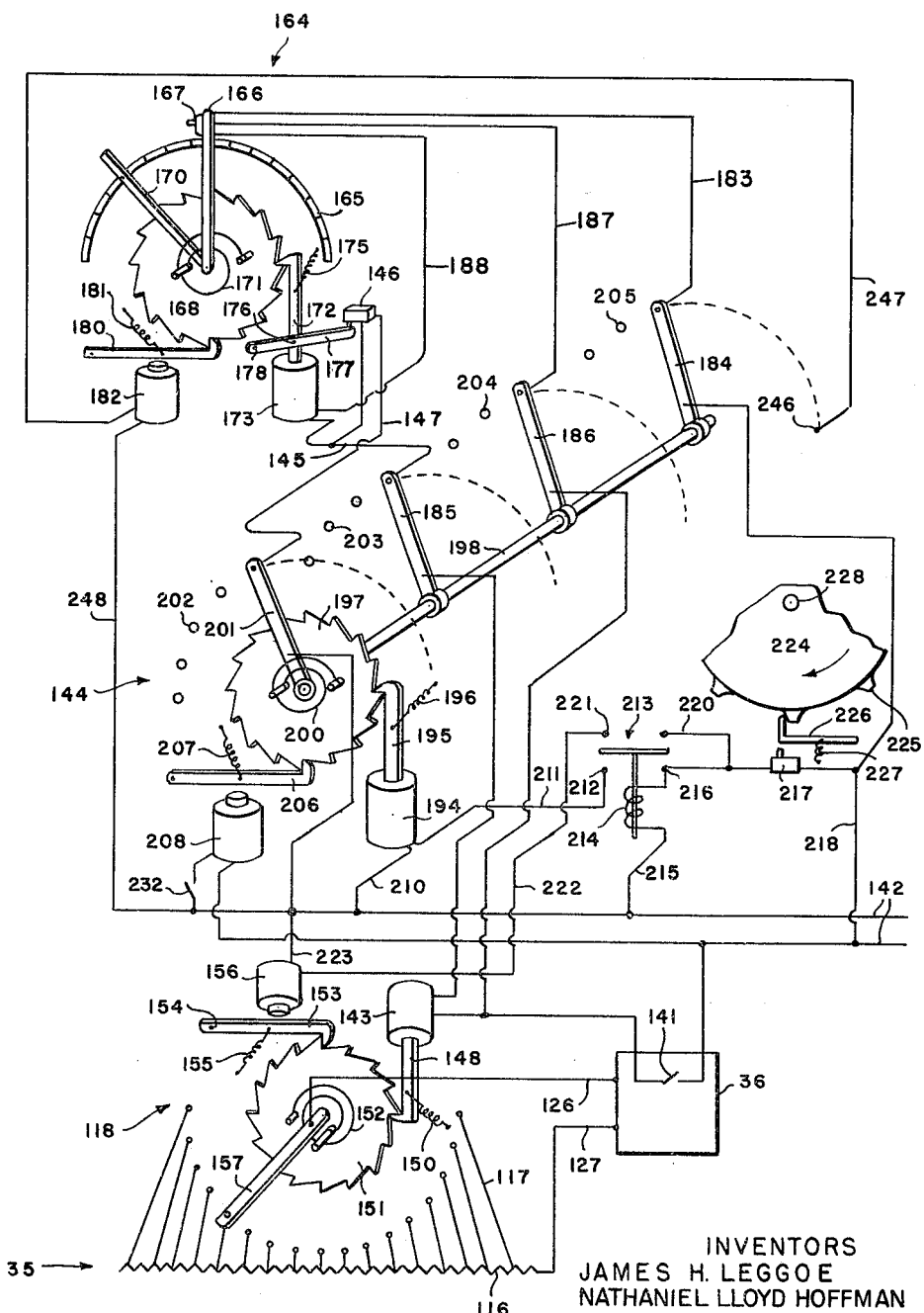

FIGURE 11 is a diagrammatic perspective of the sensitivity control of the invention.

Figure 11A:
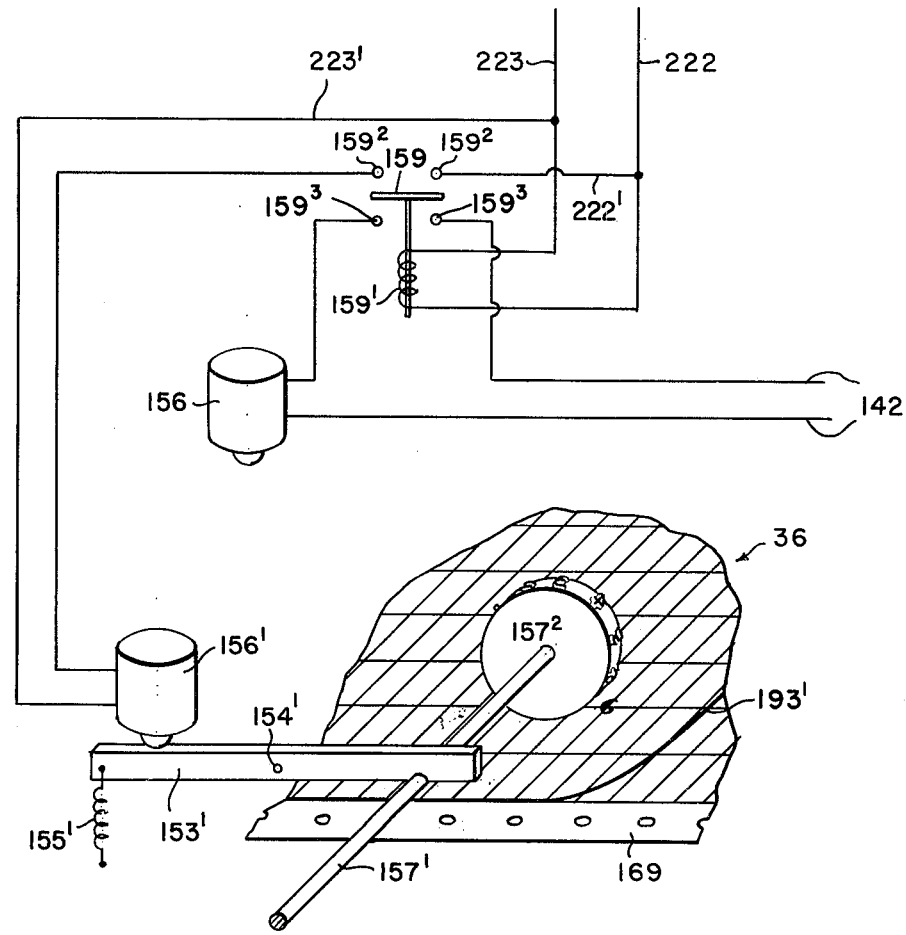

FIGURE 11a is a diagrammatic perspective of a portion of FIGURE 11, showing a variation.

FIGURE 12 is a fragmentary diagrammatic perspective of the recorder of the invention.

FIGURE 13 is an enlarged fragmentary side elevation of the adjustable cam projection on the related component sensitivity control cam as illustrated in FIGURE 11.

FIGURE 14 is a fragmentary sectional perspective of FIGURE 13 on the line 14—14.

Figure 15:
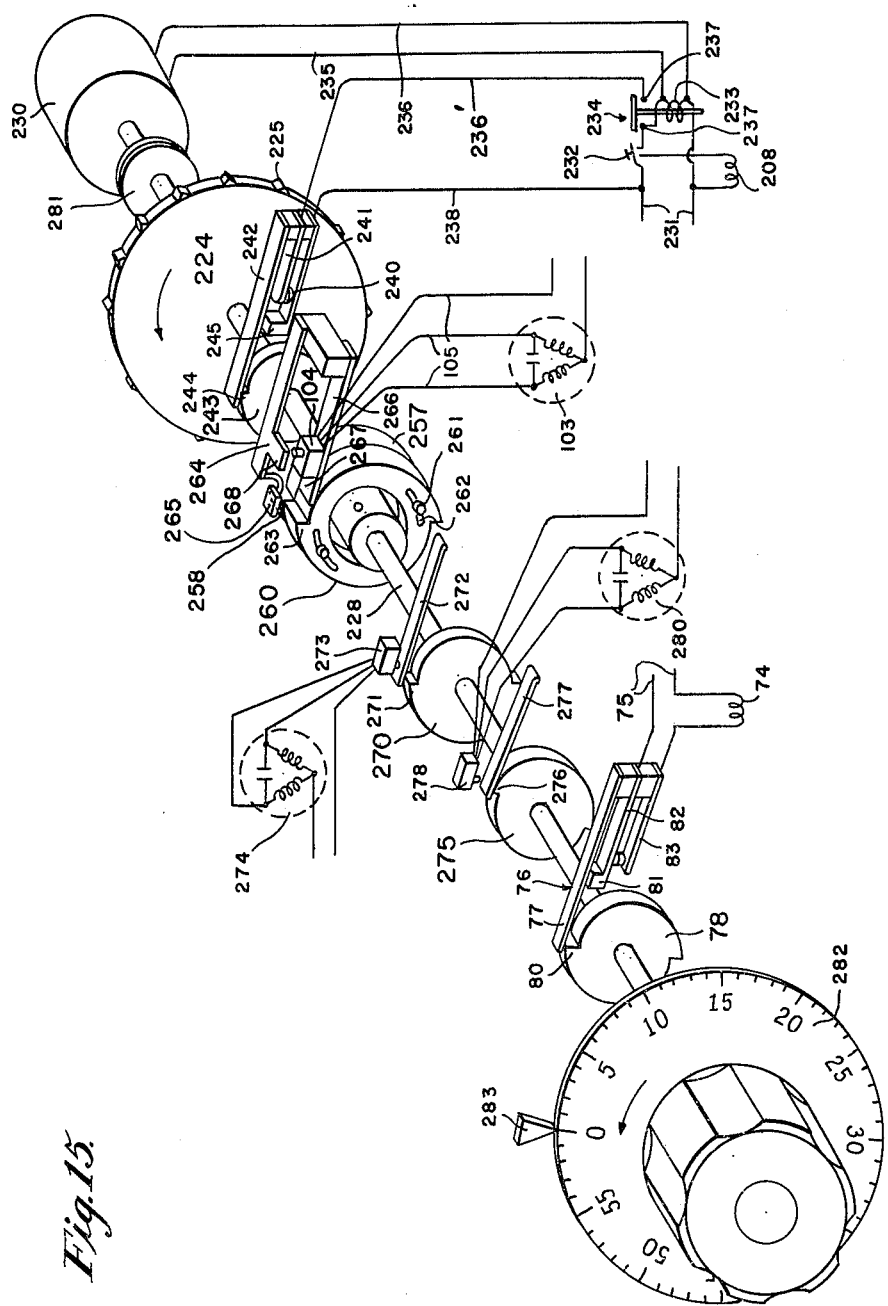

FIGURE 15 is a diagrammatic perspective of the main program control shaft and related components for the flow control and detector of the invention.

FIGURE 16 shows in plan a partial chromatogram according to the invention, plotting recording reading in millivolts against elapsed time in minutes.

Describing in illustration but not in limitation and referring to the drawings:

In the prior art gas chromatography has been subject to serious limitations, of which the following are typical examples:

(1) The accuracy was of a relatively low order when numerous components were present. Thus in a product such as illuminating gas which has a complex history and might include natural gas and manufactured gas fractions, it has been extremely difficult and tedious to obtain accurate analysis.

(2) The time required for complete chromatographic analysis of a complex gas to the accuracy desired has been of the order of several hours.

(3) In a relatively complex gas system, difficulty was caused because in some cases two or more gases passed through the separation columns in approximately the same time, resulting in overlap and precluding separate readings.

(4) There was difficulty in the prior art through the tendency to deactivate the molecular sieve column on account of carryover of components from another column.

(5) In the prior art in dealing with a complex gas including hydrocarbon vapors as well as fixed gases, all of the gases were run through a molecular sieve column, and then great difficulty was encountered in bringing the hydrocarbon vapors through the molecular sieve column, requiring heating or other expedients to overcome the tendency of these components to collect permanently in the pores. Fixed gases for the purpose of this discussion include hydrogen, nitrogen, oxygen, carbon monoxide and methane, but do not include carbon dioxide and hydrocarbon gases higher than methane.

(6) In the prior art relatively large samples were used and this interfered with high accuracy in analysis of hydrogen.

(7) When effort was made to overcome the inaccuracy of prior art bridge readings by using a more sensitive bridge, a drift of the null reading was encountered which intereferred with the precision of the reading.

(8) In dealing with a gas which may have a wide variation in concentrations of different components, it has been very difficult to obtain precise readings of gases at low concentrations without having the reading of gases present in high concentration go off the recorder scale, unless manual adjustment was constantly made.

(9) In the prior art operation, the continual presence of personnel of very high training and skill was required to properly operate the instrument, and therefore since readings were time consuming, the cost of analyses was relatively high.

The present invention overcomes various of these difficulties as follows:

(1) By the use of the device of the invention, an accuracy of 1% of the amount of each component present is obtained down to an absolute value of ±0.05%.

(2) A complete analysis in accordance with the present invention for a gas containing twelve components can be carried out in one hour.

(3) The timing of gas travel is such that overlap is avoided. The separating columns are designed so as to separate the fixed gases from the hydrocarbon vapors and to separate hydrocarbon vapors.

(4) Components which could deactivate the molecular sieve column are not passed through the molecular sieve column in backflush.

(5) In the device of the invention higher hydrocarbon gases and carbon dioxide are run through columns other than the molecular sieve column and never pass through the molecular sieve column.

(6) In accordance with the present invention an extremely small sample of the order of ¼ of a cubic centimeter of unknown gas is employed, and thus high accuracy in determination of hydrogen is possible.

(7) In the present invention, a back E.M.F. is employed in the "galvanometer" or output branch of the Wheatstone bridge which prevents drift of the null reading by establishing a null value at any stabilized inactive condition of the Wheatstone bridge, and therefore assures that the recorder base line remains at zero.

(8) The device automatically adjusts sensitivity to utilize the maximum sensitivity which can operate without the reading going off the scale.

(9) It is possible to operate the device of the invention without any attention required except to start the operation. Thus, the device of the invention is capable of automatic operation throughout, and will automatically re-set to start the next cycle.

(10) It is possible to preset sensitivity ranges for particular components when analyses are repeatedly made on an unknown gas having the same general composition.

(11) The device of the invention makes possible the separation of fixed gases such as hydrogen, oxygen, nitrogen, carbon monoxide and methane, carbon dioxide and higher hydrocarbons such as ethane, propane, iso-butane, normal butane, ethylene and propylene and in general aliphatic and aromatic hydrocarbons ($C_5+$).

In accordance with the preferred embodiment of the invention, we employ (FIGURES 1 to 6) a carrier gas source 30 such as helium as well known in the art, into which is injected a suitable gas sample by a sample metering mechanism such as dual sample metering valve 31, to pass selectively certain portions at least of the gas sample through column 32, column 33 and column 34.

In the preferred embodiment, column 32 will be an adsorption column such as a silica gel column. A typical and very desirable construction for the adsorption column 32 is a 7 foot length of ¼ inch bore tubing which is vibrator packed with Davidson PA 400 silica gel having a screen size of 30 to 60 Tyler standard mesh per linear inch. Any suitable silica gel may be used. Before packing the silica gel is heated over night at 600° F. The tubing will be of copper or other inert material, such as steel, aluminum, glass, polyethylene or nylon.

Column 33 is a molecular sieve column, and may desirably be produced by vibrator packing 4½ feet of ¼ inch bore tubing (such as copper or other inert material as above) with molecular sieve material, such as zeolite (preferably Linde 13X), having a screen size of 20 to 40 Tyler standard mesh per linear inch. Prior to packing the molecular sieve material is heated for 10 hours at 600° F. in an inert atmosphere such as argon or helium.

Column 34 is a liquid phase partition column made in two parts. The first part consists of 35 feet of ¼ inch bore tubing as above which is vibrator packed with an inert mineral such as particles of diatomaceous earth on which a thiophan sulfone, which is liquid and stable at the temperature of operation, has been adsorbed. The temperature of operation is conveniently of the order of 90° F. but may suitably be any desired temperature.

The thiophan sulfones are also known as sulfolanes, but these compounds will hereinafter be referred to as thiophan sulfones. The thiophan sulfone (or sulfolane) compound contains or consists of a saturated five-membered ring of four carbon atoms and a sulfur atom, the latter having two oxygen atoms directly attached thereto.

The thiophan sulfone may if desired be substituted by one or a plurality of lower alkyl groups (for example, methyl to butyl) and the preferred material is a di-alkyl thiophan sulfone, and in particular 2,4-dimethyl thiophan sulfone which has been found eminently suitable and may be considered the preferred embodiment of the invention. Other examples of suitable thiophan sulfones are 2,4-methyl ethyl thiophan sulfone and 2,3-dimethyl thiophan sulfone.

Starting with a 90 gram sample of pulverized diatomaceous earth (suitably Fisher Scientific Company "Columnpak") the sample is first rescreened so that the particles are in the size range of 30 to 50 Tyler standard mesh per linear inch, and the remaining fines are floated off with water. The resized diatomaceous earth is dried at 600° F. over night in air. The dried diatomaceous earth is then placed in a 500 cc. short neck boiling flask and 38.5 grams of 2,4-dimethyl thiophan sulfone dissolved in 75 to 100 cc. of ether is added with shaking. The ethereal solution is then evaporated to dryness on a hot water bath with constant agitation by rotating the flask. At the final stage of drying, a current of air which has been passed through a disiccant such as calcium chloride is blown through the flask until no odor of ether comes off. The heating should be minimized as far as possible to prevent decomposition of the 2,4-dimethyl thiophan sulfone.

The second portion of column 34 is filled with an inert material such as diatomaceous earth as above on which a di-alkyl-ester of an aliphatic dibasic acid which ester has between 12 and 42 carbon atoms has been adsorbed. The preferred material is di (2-ethylhexyl) sebacate. Suitable aliphatic dibasic acids are glutaric, adipic, pimelic, suberic, azelaic and sebacic. Suitable aliphatic alcohols are ethyl, butyl, amyl, hexyl, heptyl, n-octyl, 2-ethylhexyl, and monyl. Other suitable examples are stated in Baxter U.S. Patent No. 2,147,479, dated February 14, 1939. 40 grams of inert material suitably diatomaceous earth as referred to above are treated according to the technique described and placed in a 500 cc. short neck boiling flask. In this case 16.5 grams of di(2-ethyl-hexyl) sebacate is added suitably dissolved in 35 to 40 cc. of ether. The ether is driven off by the procedure described above and after the composition is dry (pourable in the manner of sand) 15 feet of ¼ inch bore tubing as described is vibrator packed with the inert material having the di(2-ethyl-hexyl) sebacate adsorbed thereon. The two sections of tubing are then connected up in series in either order as desired and purged over night with an inert gas suitably argon to remove all traces of ether.

It will be observed that in both portions of column 34 the ratio of adsorbent material to inert material is of the order of 40% by weight. However, it is within the scope of our invention to use for both portions of the column a ratio of adsorbent material to inert material from about 20% by weight to about 80% by weight.

It will be evident that instead of placing the two packed sections of inert material one after another in the column, the inert materials having the proper partition agents adsorbed thereon, can be mixed in the volume proportions of 35 of 2,4-dimethyl thiophan sulfone particles and 15 of di(2-ethylhexyl) sebacate particles and the mixture packed into a 50 foot tube of ¼ inch bore.

It will be evident that di(2-ethylhexyl) sebacate particles tend to separate the higher hydrocarbons by the number of carbon atoms irrespective of saturation or unsaturation, and 2,4-dimethyl thiophan sulfone particles tend to separate by carbon atoms and also by saturation and unsaturation, so that by use of the two in admixture or in succession it is possible to separate both hydrocarbons having different numbers of carbon atoms and also hydrocarbons having different numbers of carbon atoms with different degrees of unsaturation so that the recorder responses will not overlap. Those skilled in the art will recognize that various proportions of different components can be employed dependent upon the desired extent of separation.

The particles having the 2,4-dimethyl thiophan sulfone adsorbed thereon function to resolve ethane and ethylene as a first undifferentiated pair, carbon dioxide and propane as a second separate undifferentiated pair, and propylene and iso-butane as a third separate undifferentiated pair. The particles having the di(2-ethylhexyl) sebacate adsorbed thereon provide supplementary resolution of the second and third pairs by retarding propane more than carbon dioxide and iso-butane more than propylene. The ethane and ethylene cannot be separated by the liquid phase partition column, but are separated by sequence B as further described.

In the operation of the device, all of the columns 32, 33 and 34 may be at uniform temperature or at controlled temperature as well known in the art.

From the appropriate column or columns the carrier gas with the unknown sample carried by it passes to a detector 35, which may be any suitable detector, but will preferably be a thermistor or a group of thermistors or temperature responsive conductivity cells which are maintained at constant temperature in a suitable manner. The detector 35 of whatever character is operatively connected to a recorder 36.

Figure 4:
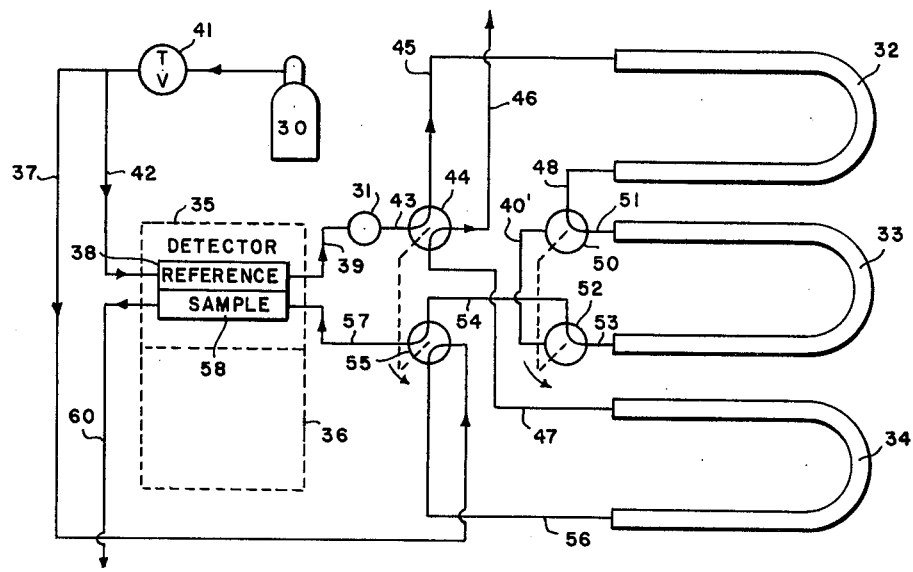
FIGURE 4 is a diagram corresponding to FIGURE 1, but showing the interconnecting flow control mechanism and related equipment.

Considering now sequence A with reference to FIGURES 1 and 4, a first sample there shown is measured by the sample metering device, suitably the dual sample metering valve 31, and the sample is injected into the carrier (helium) gas stream from the source 30 after it has passed through its reference detector cell 38. Columns 32 and 33 are placed in series during sequence A, and the gas sample first enters adsorption column 32. In adsorption column 32 the fixed gases, that is, particularly hydrogen, oxygen, nitrogen, carbon monoxide and methane, pass through practically unimpeded, while all the higher hydrocarbons starting with ethane and carbon dioxide are very appreciably retarded, so that they do not pass through adsorption column 32 during the duration of sequence A, but in effect are trapped in adsorption column 32 during this time. The fixed gases as a group leave adsorption column 32 and pass into molecular sieve column 33, where they undergo separation, so that as they leave molecular sieve column 33 they are separated into individual components, each of which is free from all other gases and consists only of its own component and the carrier gas.

When these individual components reach the detector 35, to be later described, each causes a response which will be interpreted usually as a peak on the chart of the recorder 36.

The complete recording of the humps for the fixed gases in sequence A is completed while the higher hydrocarbons are held back in adsorption column 32.

This time while the fixed gases are being recorded can be profitably used to backflush liquid phase partition column 34 by passing helium through backflushing line 37 as shown in FIGURES 1 and 4.

Figure 5:
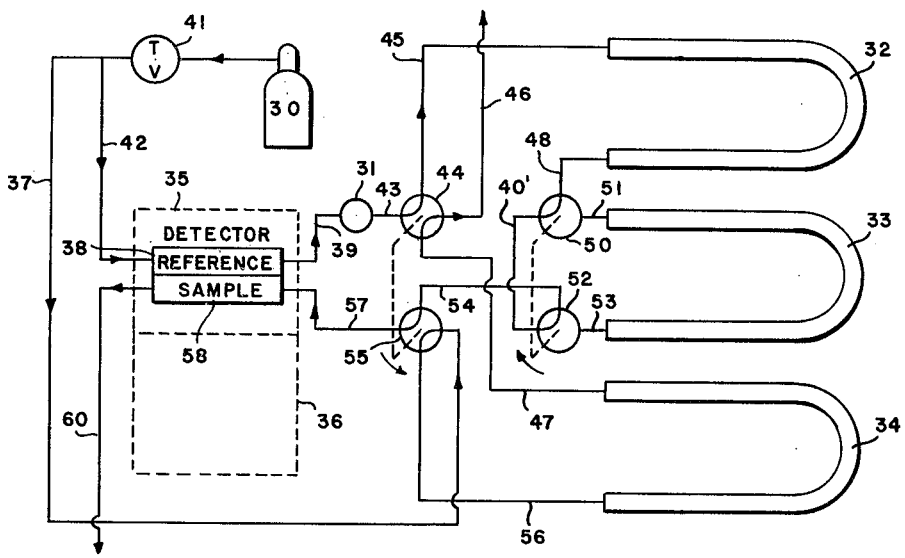
FIGURE 5 is a diagram corresponding to FIGURE 2 with the flow control mechanism and related equipment added.

In sequence B, as shown in FIGURES 2 and 5, the molecular sieve column 33 which has previously been utilized in sequence A is taken off stream, and is no longer required except to be backflushed in the following sequence. Column 33 is closed at both ends, and any gas in it remains.

In sequence B, the ethane, ethylene and the carbon dioxide are separated by adsorption column 32, and come ot the detector 35 as separate components, producing separate humps on the chart of recorder 36. While this action is taking place, liquid phase partition column 34 is still being backflushed. It is important that the by-pass or other piping illustrated as pipe 40 in FIGURE 2 and by-pass 40' in FIGURE 5, by which flow is conducted around or short circuiting molecular sieve column 33, should have a flow resistance the same as molecular sieve column 33, so that there will not be any appreciable change in flow because of shift from sequence A to sequence B.

Figure 6:
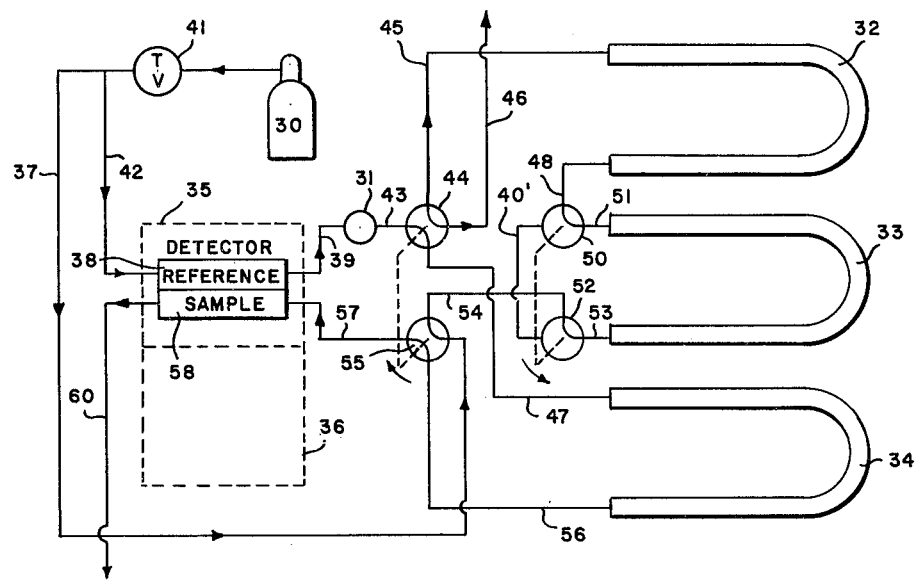
FIGURE 6 is a diagram corresponding to FIGURE 3 with the addition of the flow control mechanism and other equipment.

In sequence C, FIGURES 3 and 6, the carrier gas from source 30 is passed in the forward direction through liquid phase partition column 34, and metering valve 31 meters unknown gas sample 2 and injects it into the carrier gas. In this case, the fixed gases come through as a lump, and are not separately indicated. Ethane, ethylene form a single hump and higher hydrocarbons in the range from propane to and including normal butane, along with carbon dioxide, form distinct humps on the recorder trace. The flow resistance in liquid phase partition column 34 has been adjusted so that it is the same as the flow resistance through the column or columns in sequence A and in sequence B.

During the operation of sequence C, backflush of carrier gas is accomplished through molecular sieve column 33 and then through adsorption column 32 in that order. This feature is important so that molecular sieve column 33 will not be deactivated or rendered inoperative by introducing higher hydrocarbons and carbon dioxide from adsorption column 32. It is important that no gases, other than the fixed gases, be conducted into molecular sieve column 33.

In order to accomplish the convenient shifting of flow from sequence A to sequence B and to sequence C and then back to sequence A, it is desirable to employ the piping arrangement shown in FIGURES 4, 5 and 6. Helium or other suitable carrier gas from a tank or source 30 passes through pressure regulator 41 and line 42 to reference thermal conductivity cell 38 in the detector, and then through dual sample measuring valve 31 to connection 43 of four-way sequence changer valve 44. This four-way valve 44 has connection 45 to adsorption column 32, connection 46 to atmosphere, and connection 47 to liquid phase partition column 34. The opposite end of adsorption column 32 is connected by connection 48 to three-way sequence changing valve 50 which has a connection 51 to one end of molecular sieve column 33 and to by-pass 40'.

By-pass 40' connects to one of the ports of three-way sequence changing valve 52 which is operated on a common shaft with three-way sequence changing valve 50, so that valves 50 and 52 operate together. Three-way sequence changing valve 52 has a connection 53 to the opposite end of molecular sieve column 33 and has a connection 54 to four-way sequence changing valve 55 which is on the same shaft as four-way sequence changing valve 44, so that valves 44 and 55 operate together. Four-way sequence changing valve 55 also has a connection 56 to the opposite end of liquid phase partition column 34 and a connection to backflush line 37. Four-way sequence changing valve 55 also has a connection 57 to sample thermal conductivity cell 58 of detector 35, the opposite side of which connects by line 60 to the atmosphere. The two thermal conductivity cells 38 and 58 are associated together in a temperature controlled bath as well known in the art.

It will be evident that the sequence changing valves are conventional valves which are available on the market.

Referring particularly to FIGURES 7, 8 and 9, the dual sample metering valve 31 in the preferred embodiment comprises a preferably cylindrical housing 61 which forms a cylindrical internal chamber 62 and is closed at one end by cap 63 threaded to the housing at 64. The housing 61 is preferably of stainless steel or other distortion-and-corrosion-resisting structural material. Within the housing is a preferably cylindrical rotor 65 preferably of dimensionally stable inert low friction material such as nylon (linear polyamide) which is desirably fitted to the housing with a free sliding fit on its circumferential surface and sufficiently tightly to seal on the interengaging flat face 65', which mates with a similar flat face 61' of the housing 61. Rotor 65 is keyed on concentric shaft 66 and is resiliently urged against the mating face 61' of housing 61 by helical compression spring 67 which acts against the rotor 65 from the cap 63 surrounding the shaft 66. Shaft 66 is driven by torque motor 68 and is controlled so that it advances only by half rotations by means of ratchet 70 on shaft 66, best seen in FIGURES 7 and 9, which has teeth engaged by pawl or detent 71 pivoted at 72 and resiliently urged into engaging position by helical tension spring 73 acting from a fixed support. The detent is of magnetically susceptible material, adapted to act as an armature, and is urged toward release by detent release solenoid 74 when energized by closing electric circuit 75 by means of inertia pulse switch 76, which trips the detent 71. The inertia pulse switch 76 (FIGURE 9) has a cam follower 77 which follows cam 78 to be later described, and when released over cam projection 80 is resiliently biased to engage weighted abutment 81 on inertia switch leaf 82 to cause it to resiliently deflect below its equilibrium position (in which it is not engaged with lower switch element 83) and momentarily close the circuit against lower switch element 83. The function of the inertia pulse switch is to provide a momentary closure of the detent release circuit 75, and then immediately reopen the circuit 75, so that the detent 71 will be effective to engage the next tooth of the ratchet 70 as it is turned by the torque motor 68.

The housing 61 at the end has a port 84 connected to reference detector conductivity cell 38 by a connection 39, and a radially displaced end port 85 connected to connection 43, said ports 84 and 85 being parallel to the axis, and at their inner ends connecting with a precisely measured loop 86 in the rotor. Desirably disposed at a diametrically opposite position in the housing and parallel to the axis and desirably radially displaced from the center the same distance as ports 85 and 84 respectively, are ports 87 and 88 which at their inner ends connect with precisely measured loop 90 in the rotor. The volumes of loops 90 and 86 need not be the same although they may be the same if desired, and for convenience in description are considered as being the same.

An unknown gas sample 92 is placed in sample bottle 93, and the gas sample can be caused to flow by liquid displacement from levelling bottle 94 through flexible tube 95 and manually controlled valve 96 (normally open) at the bottom of sample bottle 93. Flow of unknown gas is permitted through manually controlled valve 97 (normally open) which connects to four-way sample bottle valve 98 having a connection 99 to duel sample metering valve port 88. The four-way sample bottle valve 98 also has a connection 100 to dual sample metering valve port 87 and a connection 101 to atmosphere. The four-way sample bottle valve 98 is operated by shaft 102 from conventional reversing torque motor 103 which has a suitable reversing switch 104 to be later described, which is in a reversing torque motor circuit 105.

Sample bottle valve 98 has two positions, either open as shown, or closed by turning ⅛ rotation, in which case all of the ports are closed. It thus functions either to cut off or connect to the one end of metering loop 90 to the sample gas and the other end of loop 90 to atmosphere.

The detector 35, as best shown in FIGURE 10 constitutes two thermal conductivity cells 38 and 58, respectively, maintained at a precise constant temperatures. The reference cell 38 is in one arm of a Wheatstone bridge 106, the sample cell 58 being in an opposite arm, and the standard resistors 107 and 108 being in other arms of the bridges. A D.C. voltage source 110 is connected between point 111 of the bridge betwen standard resistors 107 and 108 on the one hand, and slider 112 of the potentiometer 113 whose opposite ends are connected between the thermal conductivity cells 38 and 58. This detector is commonly available and well known in the art. The bridge can be less desirably operated on A.C. Between output bridge points 114 and 115 (connected between cell 38 and resistor 107, and between cell 58 and resistor 108, respectively) is connected a voltage divider 116 comprising a series of divider resistors having intermediate selector taps 117 as well known in the art, connected to a step switch 118.

In circuit between the point 115 and one end of the voltage divider is a manual switch 120 which in open position may be optionally shunted by a sensitive high resistance voltmeter 121. Also in this part of the circuit is a resistor 122.

A suitable high resistance voltmeter 121 for use with the direct current bridge illustrated in FIGURE 10 is the "Millivac" D.C. Vacuum Tube Millivolt Meter Type MV–17 B, manufactured by Millivac Instrument Corporation, which has a sensitivity up to one millivolt full scale and an input impedance of six megohms.

A suitable backout D.C. voltage source 123 well known in the art is connected adjustably to produce a desired voltage across resistor 122. The backout D.C. voltage source may suitably comprise a D.C. source 124 connected to a potentiometer 125 whose slide wire is connected at either side to opposite ends of the resistor 122. If the bridge is A.C. energized, the source 123 will be A.C.

In the prior art a great deal of difficulty has been encountered due to drift of the zero of the chart of recorder 36. Efforts have been made in the past to correct this by adjusting slider 112 of the potentiometer 113, to attempt to stabilize the electrical output of the thermal conductivity cells 38 and 58. Every time an adjustment of this character is made, however, a new set of thermal conditions prevails in the detector 35, and a suitable time must elapse before steady state conditions are attained. Since it was not desirable to wait the long time required for steady state operation, drift in the zero of the recorder was tolerated, although it caused considerable inconvenience and loss in accuracy. In accordance with the present invention, greatly increased accuracy is attained, and with this object in view, drift has been substantially eliminated. This is accomplished by avoiding adjustment in the potentiometer 113 for the purpose of stabilizing electrical output, and instead applying an opposing zero correcting voltage on the resistor 122. This does not in any way disturb the steady state conditions in the detector 35 with no sample gas passing through, since any potential appearing across the output circuit of the Wheatstone bridge 106 is opposed by an equal and opposite zero corrective potential across the resistor 122 so that the output current for a condition of balance is in any case zero.

A convenient way to adjust the device is to apply voltmeter 121 across open switch 120, and allow steady state conditions to be reached in the Wheatstone bridge 106 as noted from stabilized indication of voltage on voltmeter 121. Then the potentiometer 125 is adjusted until voltmeter 121 reads zero. This then has established a condition in which the correcting counter E.M.F. is exactly equal to the voltage appearing across the output terminals 114 and 115. Then switch 120 can be closed with assurance that no current will flow in the output circuit and the Wheatstone bridge 106 will not be unbalanced. It should be appreciated that the higher the impedance of the voltmeter 121 the closer to zero will be the current in the output circuit of the Wheatstone bridge at inactive steady state condition before applying the corrective voltage. Accordingly, the impedance of the voltmeter 121 should be as high as practical and should desirably exceed one megohm.

It is important in making readings of high accuracy of a series of gas components, to be able to adjust and preferably to predetermine the sensitivity of the recorder before the peak is reached for any particularly gas. It is also desirable that the peak be up near the top of the scale.

The step switch 118 has an output connection 126 to the recorder, the opposite recorder connection being at 127 to the fixed end of the voltage divider 116. The recorder 36, as best seen in FIGURE 12, is suitably of the character shown in FIGURE 4 of A. J. Williams, Jr. U.S. Patent No. 2,113,164, granted April 5, 1958, for Recorder and Control Circuits. The recorder has an electric drive motor 128 which drives shaft 130 and worm 131 connected to worm wheel 132 on shaft 133 on which is keyed a drum 134 about which is wound an endless cord or belt 135 which is suitably supported and guided by pulleys 136 and which carries a stylus pen 137 which makes the desired indication on the recorder chart. The shaft 133 also has keyed thereon a cam 138 which by a suitable cam projection 140 closes normally open electric switch 141. Switch 141 (FIGURES 10, 11) is connected at one side with electric power source 142, suitably A.C., and at the other side with advancing solenoid 143, the other side of which is connected to a movable arm of gang switch 144, and in one position is connected through lead 145, normally closed ratcheting switch 146, lead 147 and another arm of gang switch 144 back to the opposite side of the power source 142. When the indicator stylus 137 (FIGURE 12) reaches the top of the scale, the cam projection 140 of cam 138 closes switch 141 which energizes advancing solenoid 143 (FIGURES 10 and 11). This moves armature 148 against the action of helical tension spring 150 (fixed at one end) to advance ratchet 151 one tooth, against the action of torsional biasing spring 152 (the other end of which is fixed). The ratchet 151 is held in its advanced position by detent 153 pivoted at 154 and urged into engagement with the ratchet by helical tension spring 155 (whose other end is fixed). The detent 153 is of magnetically susceptible material and is capable of being retracted to cause re-set of the ratchet when the advancing armature 148 is released and re-set solenoid 156 is energized as will be later described. The ratchet 151 carries contact arm 157 which sweeps over contacts of recorder sensitivity step switch 118, moving from one contact to the next each time the advancing solenoid 143 is energized.

The recorder 36 will desirably be a very rapid recorder, such as Leeds & Northrup Catalog 69801 Model S Speedomax G Recorder, 0.25-Second Full Scale Response at 60 cycle, 5 mv. full scale instrument sensitivity, and the operation including the sensitivity change will be best understood by reference to the recorder chart 169, FIGURE 16. This plots time as the abscissa and millivolts as the ordinate. A hump 158 is shown on the trace in which no reduction from maximum sensitivity has been required, since the peak has not reached full scale. This may suitably correspond to propylene, and for the purpose of conveniece will be called sensitivity step 1. The hump 160 which may suitably correspond to iso-butane, indicates that the trace has reached the limit of the scale at 161, and has thus energized advancing solenoid 143 to cause adjustment of the recorder sensitivity step switch 118 to the next contact, producing a final peak 162 at sensitivity step 2.

Table 1 illustrates a desirable set of values for 17 sensitivity steps with corresponding percentages of original sensitivity, multipliers, and individual resistor values of the elements of voltage divider 116. This insures that within the limit of maximum sensitivity any reading will utilize the portion of the scale between 80% and 100% unless it never reaches the limit of the first step at maximum sensitivity. The sensitivity re-set should step down to somewhere between 75% and 100% of full scale, say 80%, in order to use the scale as efficiently as possible.

TABLE 1

| Sensitivity Step No. | Percent of Original Sensitivity | Multiplier | Individual Resistor Value |
| --- | --- | --- | --- |
| 1 | 100 | 1 | 640 |
| 2 | 80 | 1.25 | 512 |
| 3 | 64 | 1.56 | 409.6 |
| 4 | 51.2 | 1.95 | 327.68 |
| 5 | 40.97 | 2.44 | 262.14 |
| 6 | 32.76 | 3.05 | 209.72 |
| 7 | 26.21 | 3.82 | 167.77 |
| 8 | 20.97 | 4.77 | 134.22 |
| 9 | 16.78 | 5.96 | 107.37 |
| 10 | 13.42 | 7.45 | 85.90 |
| 11 | 10.74 | 9.31 | 68.72 |
| 12 | 8.59 | 11.64 | 54.98 |
| 13 | 6.87 | 14.56 | 43.98 |
| 14 | 5.50 | 18.18 | 35.18 |
| 15 | 4.40 | 22.73 | 28.15 |
| 16 | 3.52 | 28.41 | 22.52 |
| 17 | 2.81 | 35.59 | 90.10 |

Recorders are available which have a speed of 0.25 of a second for full scale response, which means that the switching interval between full scale at 161 and the corresponding value 163 on the next sensitivity level will be shown within the order of one-tenth of a second, and the peak 162 of the gas fraction will not be missed.

In order to avoid a great multiplicity of peaks which require counting in order to establish the sensitivity step number, it is desirable to be able to preset the sensitivity step for a particular gas component at or somewhat below the required sensitivity. This is best shown in FIGURES 10, 11 and 16. The sensitivity dial preset control 164 has a dial 165 provided with a series of numbered adjustment notches which engage and hold at the desired position a pivoted adjustable preset arm 166, which can be set in any adjusted position. The arm 166 carries at a suitable point near its outer end an electric switch 167 to be later described. Ratchet 168, also freely turnable on the same pivot, mounts arm 170 which is capable of swinging independent of arm 166 until it engages and closes switch 167. Ratchet 168 is biased toward retraction by torsion spring 171 acting from a suitable fixed abutment. Ratchet 168 is manipulated step-by-step by pawl armature 172 of advancing solenoid 173. The armature 172 is urged toward retraction by helical tension spring 175 acting from a fixed anchorage. The armature 172 carries a pivot 176 on which is pivoted (by a suitable slot) arm 177 which is also pivoted at its end on a fixed pivot 178. Tht arm 177 when in the retracted position of the armature 172 engages and holds closed switch 146.

As the ratchet 168 advances tooth by tooth, it is held in its advanced position by pivoted detent 180 which is biased toward engagement of the ratchet by helical tension spring 181 acting from a suitable anchorage. The detent 180 is magnetically susceptable and acts as an armature for re-set solenoid 182. It will be understood that each step of the advancing solenoid armature 172 and each step of the ratchet 168 advance the arm 170 one numbered notch of the dial 165.

Switch 167 is normally closed until it is encountered by arm 170 which opens it. Assuming that switch 167 is in its normally closed position, advancing solenoid 173 is in parallel with advancing solenoid 143 of step switch 118 so that the two will advance together. Lead 147 and ratcheting switch 146, which is closed, connect to advancing solenoid 173 and through closed switch 167 and through lead 183, and arm 184 of gang switch 144 are connected to the source 142. Advancing solenoid 143 is connected in parallel with advancing solenoid 173 through lead 145, switch arm 185, switch arm 186 of gang switch 144, switch 167, lead 187 and lead 188.

It will be understood that the operation of the advancing solenoids and related mechanism is as follows:

When the gang switch 144, by means later to be described, moves to a particular position which selects the sensitivity setting for a particular gas, for example the position illustrated in FIGURE 11, and recognizing that adjustable preset arm 166 has been set to a particular position on the dial 165 for that gas component, and arm 170 and ratchet 168 are at the re-set position, the appropriate advancing solenoid 173 is energized, and as soon as it energizes it advances the ratchet 168 one step but in doing so it opens switch 146 which was previously held closed in the position of FIGURE 11. This results in interrupting momentarily the circuit of advancing solenoid 173, and permitting the armature 172 to retract until it can close switch 146, and this action is repeated until the arm 170 moves far enough to encounter and open switch 167. There is enough inertia in armature 172 to advance the ratchet one tooth notwithstanding that the advancing solenoid 173 has become deenergized Concurrently with the step-by-step advancing action of solenoid 173, there is step-by-step advancing action of advancing solenoid 143, which causes the stepping switch 118 to change its position with respect to the voltage divider 116 corresponding to the desired sensitivity. The same switch 146 interrupts the circuit of solenoid 143 on each step since both advancing solenoids are in parallel.

At the opening of switch 167 by trip arm 170, the circuits of the advancing solenoids 173 and 143 are interrupted, and this causes a cessation of stepping action through the agency of ratchet 168. This has, however, achieved a setting of the voltage divider 116 which establishes the desired preliminary sensitivity, although if subsequently stylus 137 were to reach the top of the scale so as to close switch 141, the recorder sensitivity step switch 118 will move a further step or steps.

The hump 190 for propane at the extreme right of FIGURE 16 shows the effect of an initial presetting to sensitivity step 13 at line 191. Subsequently there are two additional sensitivity steps indicated at 192 and 193 which shows the final peak. As shown in Table 1 there is a multiplier of 22.73 for sensitivity step 15 corresponding to point 193.

It will be evident that in the device as described, there is an initial predetermined stepping response based upon the setting of the dial 165 for the particular gas, and this is supplemented, if it does not produce the correct ultimate sensitivity, by a further sensitivity step or steps which respond to the actual conditions encountered in the operation of the recorder 36.

Should the final peak occur during the very interval that the sensitivity is being changed to the final step, it will be evident that the peak at 192 can be read as the final result within a high degree of accuracy.

The advance of gang switch 144 is accomplished by advancing solenoid 194 which has an armature 195 provided with a pawl, and biased toward retraction by helical tension spring 196 acting from an anchorage. The pawl-armature 195 engages ratchet 197 on shaft 198 and urged toward restoration to initial position by torsion spring 200 secured to a suitable fixed abutment. The shaft 198 carries swinging arms 201, 185, 186 and 184 which engage suitably arcuately disposed sets of contacts 202, 203, 204 and 205 as shown.

There is a suitable pivoted detent 206 which holds the ratchet 197 in any desired advanced position and is spring biased toward engagement with the ratchet by helical tension spring 207. The detent 206 is magnetically susceptible and is released by re-set solenoid 208.

The advancing solenoid 194 is connected at one side by lead 210 to the source 142 and at the other side is connected by lead 211 to make-contact 212 of time delay relay 213. The time delay relay 213 has its relay coil 214 connected by lead 215 to the source and at the other side connected to a second make-contact 216 of time delay relay 213. From make-contact 216 it is connected through normally open switch 217 and lead 218 to the opposite side of the source 142. Contact 216 is also connected to a first break-contact 220 of relay 213. A second break-contact 221 of relay 213 is connected by lead 222 with one side of re-set solenoid 156, the opposite side of which is connected by lead 223 to the power source 142.

It will be understood that when the switch 217 is closed, but before the relay 213 actually picks up because of the time delay, a circuit is completed through break-contacts 220 and 221 and the movable contact element of the relay to energize re-set solenoid 156 through lead 222 and 223. This causes detent 153 to retract and the torsion spring 152 re-sets ratchet 151 so that the voltage divider 116 is contacted at the maximum sensitivity or step 1. As soon as the time relay interval has expired, time delay relay 213 picks up, closing contacts 216 and 212 and this energizes advancing solenoid 194, through leads 211 and 210 to advance ratchet 197 and shaft 198 to the next contacts, thus bringing contact arms 201, 185, 186 and 184 into engagement with the next contact element of contact sets 202, 203, 204 and 205 to activate the next succeeding sensitivity preset control 164′ (assuming that 164 was previously activated). Under these conditions, once the 4-gang component sensitivity control step switch 144 has been advanced, the successive incremental operation of advancing solenoids 173 and 143 connected in parallel takes place, corresponding to the next gas component in the sequence as already described.

Switch 217 which thus controls the advance of the gang step switch 144, is actuated by cam 224 which has a series of cam projections 225 which engage pivoted follower 226 which is biased by helical compression spring 227 acting from an anchorage to engage the cam 224. The cam 224 is mounted on shaft 228 which is a common shaft for a plurality of cams as shown in FIGURE 15. The shaft 228 is driven by synchronous timing motor 230, which is driven from alternating current source 231 through a special starting circuit. The special starting circuit includes push button switch 232 which when momentarily closed energizes re-set solenoid 208 for sensitivity control switch 144 as shown in FIGURES 11 and 15. It also energizes relay coil 233 and also timer motor 230 through leads 235 and 236, thus starting the timer motor. The relay coil 233 closes relay contacts 237 and also acts as a holding coil when push button switch 232 retracts. At this time the timer motor 230 is driven through lead 238, and normally closed time operated contacts 240 and 241, lead 236′, contacts 237 and leads 235 and 236. At the end of the complete cycle, cam follower 242, engaging timer motor control cam 243 on shaft 228, drops off cam projection 244 and engages abutment 245 of contact 240 to momentarily separate contacts 240 and 241. Abutment 245 is desirably a massive element and contact elements 240 and 241 involve resilient springs or the like so that although contacts 240 and 241 are normally closed in all equilibrium positions of cam follower 242 on the cam 243, momentary separation takes place due to inertial over-travel of element 240 at the instant came follower 242 drops off cam projection 244. During the separation the relay holding coil 233 is deenergized and relay 234 opens and this stops timer motor 230 in preparation for the next cycle.

When the final contact 246 of contact set 205 is engaged by switch arm 184, re-set solenoids 182 for each sensitivity preset control 164 for the gas components are energized through lead 218, switch arm 184, contact 246, lead 247 and lead 248 to the opposite side of the source 142, and similarly for each one of the other controls 164′, etc., so that all the dials have their arms 170 re-set to their starting points for the next cycle.

The construction of cam 224 will preferably be as shown in FIGURES 13 and 14 to permit ready adjustability of the settings of the projections 225. This is desirably accomplished by providing a flange or rim 250 around the outside of the cam 224, and mounting the projections 225 by providing inwardly extending clamping portions 251 working against outwardly extending portions 252 which engage the outside of the rim or flange. The projections are adjustable circumferentially and set in any desired position as by set screws 253 located radially inwardly of the rim 250.

Each projection desirably includes a somewhat gradual approach portion 254 which tends to deflect the follower 226 and a short radial portion 255 which deflects the follower abruptly to engage the operator of switch 217, and this closes the switch 217.

There is then permissibly a gradual reverse face 256.

Shaft 228 has suitably keyed thereon sample bottle valve control cam portion 257 which has projections 258 thereon, an identical cooperating coaxial cam portion 260 axially displaced along the shaft and engaging the cam portion 257, mounted against the face of cam portion 257 by mounting screws 261 which extend through arcuate slots 262 of cam portion 260, so that projections 263 of cam portion 260 can be set circumferentially displaced with respect to the projections 258 of cam portion 257. A suitable cam follower element 264 has a cam follower portion 265 which rides cam portion 257, and cooperating cam follower element 266 has a follower portion 267 which rides the outside of cam portion 260. Cam follower element 266 mounts single-pole double-throw switch 104 as shown more in detail in FIGURE 7, which is normally engaged by side abutment 268 of cam follower element 264 and held in the position which moves sample bottle valve 98 to close all ports. Reversing torque motor 103 is of the type having two identical windings energized from a voltage source with a capacitor in series with one or the other winding across the source as selectively so connected by operation of the switch 104 to produce desired opposite directions of rotation.

Thus, switch 104 causes reversing torque motor 103 to hold sample bottle valve 98 closed except during the short interval of time when cam follower element 266 drops off cam projection 263 prior to the time that cam follower element 264 drops off cam projection 258. Accordingly, a very precisely controlled interval of time for opening of sample bottle valve 98 can be set. Shaft 228 also mounts keyed thereon column selector valve cam 270 having two radial levels separated by abrupt actuating abutments 271 which engage follower 272 and operate torque motor reversing switch 273 to reverse reversing torque motor 274 of the character previously described and thus reverse four-way valves 44 and 55 to shift from sequence B to sequence C or back to sequence A. The cam 270 provides fast make and break for instantaneous reversal. Also mounted and keyed on shaft 228 is column selector valve cam 275 which has two radial levels separated by abrupt actuating abutments 276, and the outside of the cam engages follower 277.

When it shifts from one level to the other the follower 277 operates reversing switch 278 of the character previously described to cause reversing torque motor 280 to drive in the respective opposite directions and thus to shift three-way valves 50 and 52 from the position of sequence A to the position of sequence B and from the position of sequence B to the position of sequence C.

In some cases it may be desirable to have a numerical or other suitable indication on the recorder chart trace which shows the sensitivity step number applicable to the chart trace for the final sensitivity setting for any particular component gas.

FIGURE 11a illustrates leads 223 and 222 which are the same as leads 223 and 222 on FIGURE 11, but instead of being directly connected to re-set solenoid 156, are connected to operating coil 159′ of relay 159 having break-contacts $159^2$ and make-contacts $159^3$. The relay 159 is a time delay relay set for a shorter time than the delay on time delay relay 213. Lead 223 is connected to lead 223′ which is connected at one side of printing solenoid 156'. The other side of printing solenoid 156' is connected to lead 222 by lead 222' through break-contacts 159² of relay 159. The make-contacts 159³ of relay 159 are connected through re-set solenoid 156 to the power source 142.

Printing solenoid 156' operates on magnetically susceptible armature 153' which is biased toward retraction by helical tension spring 155' acting from an anchorage, and pivoted at an intermediate point at 154'. The armature at its opposite end bears against the side of resilient shaft extension 157' from recorder sensitivity step switch shaft 157. Shaft 157' carries printing wheel 157², which thus is actuated to print on the chart 169. The printing sensitivity step number will be provided desirably at the tail of the trace 193' at the final sensitivity step setting. There will be a sensitivity step number of each step which corresponds to a tooth on ratchet 151 of the recorder sensitivity step switch 118.

Although shaft extension 157' is indicated as being an extension of sensitivity step switch shaft 157, it is obvious that the print wheel 157² may be disposed in the recorder in a suitably convenient location for printing on the chart 169, and shaft 157' may be geared or chain-driven from step switch shaft 157 or otherwise rotated in synchronism therewith as by servomotors or the like.

When leads 222 and 223 are energized by closing switch 217, this instantly energizes printing solenoid 156' which causes armature 153' to be operated and to move printing wheel 157² against the chart 169 and thus print the appropriate sensitivity step number which corresponds to the then prevailing angular position of recorder sensitivity step switch 118 prior to re-set. At the same time, delay relay coil 159' is energized, and after the time delay expires the relay shifts and energizes re-set solenoid 156, which retracts detent armature 153 and releases the ratchet 151. When relay 159 shifts this deenergizes the printing solenoid 156' and releases the printing wheel from engagement with the chart.

The device is then re-set for the determination of the next gaseous component.

The printing wheel will of course be equipped with suitable inking means.

Interposed in shaft 228 between the motor and cam 224 is a clutch 281 which permits rotation of shaft 228 by means of dial 282 with respect to index 283 so that any desired position of the cams as a group can be established or manually set by the operator. Thus, it is possible to skip any portion of the cycle which may be desired or to start a new cycle when desired.

The shaft 228 also has keyed to it the cam 78 which operates the inertia pulse switch 76, as previously described.

EXAMPLE

The following is a typical example of the operation of the device of the invention in the analysis of a gaseous fuel such as an oil gas, which will contain the fixed gases hydrogen, oxygen, nitrogen, methane and carbon monoxide, and also carbon dioxide and the hydrocarbons: ethane, ethylene, propane, propylene, iso-butane and normal butane. It will be understood that the oil gas contains other components and analyses can be made for these additional components if desired by extending the period of operation. It will be evident, however, that the same principles are applicable in testing catalytically reformed gas, refinery gas, coke oven gas, industrially available propane or natural gas.

For the purpose of this example, a Perkin-Elmer Vapor Fractometer Model 154B modified in the manner described is used.

The gas to be analyzed has been dried before analysis.

When starter button 232 is monentarily depressed, this switch re-sets the component selector step switch 144 and starts timer motor 230 as previously explained to produce the sequence of steps described below.

*Step 1*

Step 1, at zero time, involves the operation of cams 257 and 260. Sample bottle valve 98 opens to flush loop 90 of dual sample metering valve 31 with the sample gas flowing from sample bottle 93 to atmosphere at 101. During Step 1 purging is accomplished. The flow of sample gas is slow to minimize expansion or contraction which might cause change in temperature.

*Step 2*

At time 50 seconds, cams 257 and 260 cause sample bottle valve 98 to shut off further flow of sample. This seals off loop 90 in dual sample metering valve 31 at both ends respectively from the sample bottle 93 and from the atmosphere at 101. The time interval until Step 3 reestablishes temperature equilibrium in sample loop 90.

*Step 3*

At time 1 minute and zero seconds, cam 78 causes dual sample metering valve 31 to turn a half revolution with a snap action and bring metering loop 90 into alignment with ports 84 and 85 (FIGURE 7) in the sample valve housing. Previously carrier gas, suitably helium from source 30 after passing through reference conductivity cell 38 (FIGURE 4 to 6) was flowing through loop 86, through connection 43 and through valve 44 and then through adsorption column 32 and molecular sieve column 33 to the sample conductivity cell 58 and then to atmosphere. The result of shifting dual sample metering valve 31 as described is to inject the sample contained in metering loop 90 into the carrier gas stream and carry it into the adsorption column 32, certain components including the fixed gas components being carried through the adsorption column 32 and the fixed gas components being carried through the molecular sieve column 33. At certain elapsed times these certain components of the sample in the carrier gas will arrive at sample conductivity cell 58 as later explained.

*Step 4*

At time 3 minutes and 10 seconds, a first projection on cam 224 (FIGURE 15) actuates cam follower 226 (FIGURE 11) which re-sets recorder sensitivity step switch 118 and then advances component sensitivity control step switch 144 to actuate the oxygen sensitivity preset control 164.

Any argon present will come through unseparated with the oxygen.

*Step 5*

At time 4 minutes and 15 seconds, the next projection on cam 224 (FIGURE 15) actuates nitrogen sensitivity control 164'. It will be understood that each time a new projection on cam 224 actuates the next sensitivity preset control, it also first causes follower 226 to reset recorder sensitivity step switch 118. This will not be repeated for the subsequent steps but will be understood.

*Step 6*

At 6 minutes and zero seconds, the next projection on cam 224 actuates the methane sensitivity control. It is understood that these various sensitivity preset controls are similar to 164 and 164'.

*Step 7*

At 7 minutes and 45 seconds, the next projection on cam 224 actuates the carbon monoxide sensitivity control.

*Step 8*

At 10 minutes and zero seconds, cam 275 (FIGURE 15) causes selector valves 50 and 52 (FIGURE 4) to shift counterclockwise to convert from sequence A to sequence B (FIGURE 5), by-passing molecular sieve column 33 through which the fixed gases have previously passed, and preparing to allow the ethane, carbon dioxide and ethylene to flow from the adsorption column through the by-pass 40′ to the detector.

*Step 9*

At 12 minutes and 30 seconds, the next projection on cam 224 actuates the ethane sensitivity preset control.

*Step 10*

At 16 minutes and 40 seconds, the next projection on cam 224 actuates the carbon dioxide sensitivity preset control.

*Step 11*

At 21 minutes and zero seconds, the next projection on cam 224 actuates the ethylene sensitivity preset control.

*Step 12*

At 30 minutes and zero seconds, the next projection on cam 224 actuates the fixed gases sensitivity preset control. This is done in preparation of sequence C.

*Step 13*

At 31 minutes and zero seconds, cam 270 causes column selector valves 44 and 55 (FIGURE 5) to turn counterclockwise ot divert the carrier gas stream through liquid phase partition column 34 and start backflush of the other columns (FIGURE 6).

*Step 14*

At time 31 minutes and zero seconds, cam 275 also causes column selector valves 50 and 52 (FIGURE 5) to turn clockwise to backflush first through molecular sieve column 33 and then through adsorption column 32 (FIGURE 6).

*Step 15*

At 35 minutes and zero seconds, cams 257 and 260 cause sample bottle valve 98 to open and flush loop 86 of dual sample metering valve 31 with the sample to atmosphere at 101.

*Step 16*

At 35 minutes and 50 seconds, cams 257 and 260 cause sample bottle valve 98 to shut off. The delay until Step 17 stabilizes the temperature in the sample loop.

*Step 17*

At 36 minutes and zero seconds, cam 78 causes dual sample metering valve 31 to rotate one-half revolution and bring loop 86 into the carrier gas stream entering through port 84, carrying the second sample into liquid phase partition column 34.

Between this step and the next step, the fixed gases hydrogen, oxygen, nitrogen, methane and carbon monoxide which come through liquid phase partition column 34 unseparated, cause a hump on the recorder chart 169. The recorder has been previously preset (Step 12) to a sensitivity low enough to produce a low scale reading. No significance attaches to this hump because these components have been previously resolved from the first sample.

*Step 18*

At 42 minutes and zero seconds, the next projection on cam 224 actuates the ethane-ethylene sensitivity preset control. At this point the ethane and ethylene show up on the recorder chart as a single unseparated hump. These components have already been separately recorded at Steps 9 and 11.

*Step 19*

At 43 minutes and 36 seconds, the next projection on cam 224 actuates the carbon dioxide sensitivity preset control. This gives a check reading on carbon dioxide but it is of 5 to 10 times as high sensitivity as the previous corbon dioxide reading at Step 10. The carbon dioxide hump is steeper in this case.

*Step 20*

At 45 minutes and 24 seconds, the next projection on cam 224 actuates the propane sensitivity preset control.

If acetylene is present it is lumped with propane and the propane peak will include the acetylene. Except in very rare cases acetylene is an insignificant component of fuel gases and ordinarily may be disregarded.

*Step 21*

At 47 minutes and 15 seconds, the next projection on cam 224 actuates the propylene sensitivity preset control.

*Step 22*

At 50 minutes and zero seconds, the next projection on cam 224 actuates the iso-butane sensitivity preset control.

*Step 23*

At 54 minutes and 30 seconds, the next projection on cam 224 actuates the normal-butane sensitivity preset control.

It will be evident that this sequence of separations into different components can be extended as desired to higher hydrocarbons, where the concentrations of such materials are sufficient to make this worth reading. If these higher hydrocarbon components are not resolved, they can be determined as a lump value by difference.

*Step 24*

At 59 minutes and 58 seconds, a final projection on cam 224 re-sets all of the sensitivity preset controls as well as re-setting the recorder sensitivity step switch 118 in preparation for the next cycle.

*Step 25*

At 59 minutes and 59 seconds, cam 270 causes column selector valves 44 and 45 to turn clockwise to divert the carrier gas stream through adsorption column 32 and molecular sieve column 33 in series and to backflush liquid phase partition column 34 in preparation for the next cycle.

*Step 26*

At 60 minutes and zero seconds, cam 243 causes timing motor 230 to stop at the end of the cycle.

As explained above, it is important that in the shifts between sequence A, sequence B and sequence C and then back to sequence A, the frictional resistance encountered to flow through the column or columns which are being actively employed at any given time should be the same so that there will be a minimum of disturbance in the relation between the bridge arms when changing sequences. With this in view adjustment of resistance is made by suitable valves, orifices, columns or otherwise, not shown, so that the resistance through columns 32 and 33 in series in sequence A is equal to the resistance through column 32 and the by-pass of column 33 in sequence B, and is equal to the resistance of column 34 in sequence C.

Before operation is started on a particular day the back e.m.f. adjustment should be made as described previously, after steady state has been reached on the bridge as determined by observations of voltmeter 121.

There is no need for a sensitivity preset control for the hydrogen component because in any case hydrogen will not produce more than one or two sensitivity step variations.

In order to initially calibrate the apparatus, a calibration curve will be run for each component. This involves introducing in the sample bottle 93 a sample which contains 100% of each component gas and then successive samples which contain various percentages of each component gas in carrier gas. It is preferred to have all of the various component gas calibration samples tested at the normal pressure of the device. A calibration curve is made for each component which plots relative peak height of the hump in percent against component gas concentration in the calibration sample in volume percent. In making an actual reading the millivolts of the peak height of the actual sample component are determined and this is converted to percentage of the millivolts developed by a sample which was 100% of that component and this is then read off the calibration curve for that component.

In view of our invention and disclosure variations and modifications to meet individual whim or particular need will doubtless become evident to others skilled in the art, to obtain all or part of the benefits of our invention without copying the structure and method shown, and we, therefore, claim all such insofar as they fall within the reasonable spirit and scope of our claims.

Having thus described our invention what we claim as new and desire to secure by Letters Patent is:

1. The method of discriminating in gas chromatography between the gaseous components carbon dioxide, propane, propylene and iso-butane in the presence of ethane and ethylene in any respective proportions in a gas containing mixed components, which comprises measuring a sample of said gas, injecting said sample into a carrier gas, and passing said measured gas sample in said carrier gas through a separating column which includes particles having adsorbed thereon di-alkyl ester of an aliphatic dibasic acid, which ester contains between 12 and 42 carbon atoms, and also particles having adsorbed thereon a thiophan sulfone which is liquid and stable at the temperature of operation of said column.

2. The method of claim 1, in which said sulfone is 2,4-dimethyl thiophan sulfone.

3. The method of discriminating in gas chromatography between the gaseous components carbon dioxide, propane, propylene and iso-butane in the presence of ethane and ethylene in any respective proportions in a gas containing mixed components, which comprises measuring a sample of said gas, injecting said sample into a carrier gas, and passing said measured gas sample in said carrier gas through a separating column which includes particles having adsorbed thereon a liquid phase partition medium having a capacity to resolve ethane and ethylene as a first undifferentiated pair, carbon dioxide and propane as a second separate undifferentiated pair, and propylene and iso-butane as a third separate undifferentiated pair, and also particles having adsorbed thereon di-alkyl ester of an aliphatic dibasic acid, which ester contains between 12 and 42 carbon atoms for discrimination between carbon dioxide and propane and between propylene and iso-butane.

4. The method of claim 1, in which said column contains particles having said di-alkyl ester and particles having said sulfone sequentially arranged in series.

5. The method of claim 1, in which said column contains particles having said di-alkyl ester and particles having said sulfone mixed together.

6. The method of separating carbon dioxide from propane, in the presence of the gaseous components ethane or ethylene in any respective proportions for gas chromatography, which comprises measuring a sample of said gas, injecting the gas sample in a carrier gas, passing said gas sample in said carrier gas through a separating column which contains a di-alkyl ester of an aliphatic dibasic acid containing between 12 and 42 carbon atoms, and which also contains 2,4-dimethyl thiophan sulfone.

7. The method of separating propylene and isobutane in the presence of the gaseous components ethane or ethylene in any respective proportions present in a mixed gas for gas chromatography, which comprises measuring a sample of said gas, injecting the sample into a carrier gas, and introducing the sample in the carrier gas through a separating column which contains a di-alkyl ester of an aliphatic dibasic acid containing between 12 and 42 carbon atoms, and which also contains 2,4-dimethyl thiophan sulfone.

8. The method of separating carbon dioxide from propane and propylene from iso-butane in the presence of the gas components ethane or ethylene in any respective proportions which comprises measuring a gas sample, injecting the sample into a carrier gas, introducing the sample into a separating column which includes a di-alkyl ester of an aliphatic dibasic acid, having from 12 to 42 carbon atoms in the ester, and 2,4-dimethyl thiophan sulfone, and separating the gas components in said column despite the presence of ethane and ethylene in any respective proportions in said gas sample.

9. The method of stabilizing the zero current condition of the output circuit of an unbalanced Wheatstone bridge, which comprises interrupting the output circuit, measuring the voltage across the point of interruption of the output circuit, and when said voltage becomes constant indicating the arrival of a steady state condition in the Wheatstone bridge, introducing counter E.M.F. into the output circuit until the voltage thus measured is zero, then closing the output circuit at the point of interruption, and maintaining the counter E.M.F. at said final value.

10. The method of gas chromatography, using a gas which contains fixed gas components, ethane, carbon dioxide, ethylene and higher hydrocarbons, which comprises measuring a first gas sample and injecting it into a carrier gas stream, passing said carrier gas stream continuously through an adsorption column and a molecular sieve column and then through a detector and recording fixed gas components as indicated by the detector on a single recorder trace, next passing ethane, carbon dioxide and ethylene in the carrier gas stream directly from the adsorption column to the detector and recording said ethane, carbon dioxide, and ethylene on the same recorder trace, then measuring a second sample of said gas and injecting it into the carrier gas stream and passing said second gas sample in the carrier gas stream directly through a liquid phase partition column to the detector, and recording higher hydrocarbons of said second sample on the same trace of said recorder.

11. The method of claim 10, which comprises backflushing the molecular sieve column and the adsorption column in series in that order by a carrier gas stream so that material from the adsorption column will not cause deterioration of the molecular sieve column.

12. The method of claim 11, which comprises maintaining the molecular sieve column at all times free from flow of all gases except for the carrier gas and fixed gas components of the unknown gas, whereby the molecular sieve column is protected against deterioration from carbon dioxide and higher hydrocarbons by passing the carrier gas stream containing the unknown sample through the adsorption column and the molecular sieve column in series and bypassing the molecular sieve column before carbon dioxide and said higher hydrocarbons emerge from the adsorption column, and by subsequently backflushing these columns by passing carrier gas first through the molecular sieve column and then through the adsorption column.

13. The method of separating components of an unknown gas by separating columns and preparing the separating columns for further use, which comprises measuring a sample of unknown gas and injecting it into a carrier gas stream, passing the carrier gas stream with the unknown gas sample successively through an adsorption column and a molecular sieve column while concurrently backflushing a liquid phase partition column by carrier gas, by-passing the molecular sieve column before any carbon dioxide and higher hydrocarbons which may be present emerge from the adsorption column while continuing to backflush the liquid phase partition column, measuring a second sample of said unknown gas and injecting it into the carrier gas stream, passing the carrier gas with said second sample of the unknown gas through the liquid phase partition column and concurrently backflushing the carrier gas through the molecular sieve column and the adsorption column in that order, so that said columns by the end of the cycle are ready for re-use in the next cycle.

14. A separating column for gas chromatography, comprising an elongated casing, an inert filling within said casing, certain particles of said filling having adsorbed thereon di-alkyl ester of an aliphatic dibasic acid, said ester containing between 12 and 42 carbon atoms, and an adsorbent on certain other particles of said filling composed of a thiophan sulfone which is liquid and stable at the temperature of operation of the column.

15. A column of claim 14, in which said sulfone is 2,4-dimethyl thiophan sulfone.

16. A column of claim 14, in which said ester and said sulfone are applied to particles in different parts of said column.

17. A column of claim 14, in which said ester and said sulfone are applied to particles mixed together in said column.

18. A column of claim 14, in which the casing has an internal diameter of one-quarter inch, and the volume of particles having said ester is to the volume of particles having said sulfone as 15 is to 35.

19. A column of claim 14, in which the ratio of adsorbent material to inert material is in the range of from about 20% by weight to about 80% by weight.

20. In mechanism for gas chromatography, an adsorption column, a molecular sieve column and a liquid phase partition column, means for metering samples of unknown gas, means for injecting said metered samples of unknown gas into a carrier gas stream, single detector means, single recorder means operatively connected to said detector means, first, second, third and fourth multiport valve means, conduit means connecting in sequence the metering means, said first valve means, said adsorption column, said second valve means, said molecular sieve column, said third valve means, said fourth valve means and said detector means, whereby said carrier gas stream containing a sample of unknown gas may selectively be directed from said metering means through said adsorption column and then through said molecular sieve column to said detector means, said second and third valve means being interconnected by bypass conduit means and being selectively operable for bypassing said molecular sieve column, whereby said carrier gas stream containing components of unknown gas may selectively be directed from said adsorption column directly to said detector means, conduit means connecting in sequence said first valve means, said liquid phase partition column and said fourth valve means, said first valve means being operable to switch the flow of carrier gas containing components of unknown gas to said liquid phase partition column instead of to said adsorption column, and said fourth valve means being operable to provide flow of carrier gas containing components of unknown gas to said detector from said liquid phase partition column instead of from said third valve means, whereby said carrier gas containing another sample of unknown gas may selectively be directed from said metering means directly through said liquid phase partition column to said detector means.

21. Mechanism of claim 20, in combination with means operative while said carrier gas stream is flowing through said adsorption column to said detector means for passing carrier gas through said liquid phase partition column to backflush the same, and means operative while said carrier gas stream containing said second sample is passing through said liquid phase partition column to said detector means for passing carrier gas through said molecular sieve column and then through said adsorption column in that order for backflushing said molecular sieve column and said adsorption column.

22. Mechanism of claim 20, in which said recorder means plots a single recorder trace having separate humps for various gas components of said unknown gas.

23. In mechanism for gas chromatography, an adsorption column, a molecular sieve column and a liquid phase partition column, means for metering samples of unknown gas, means for injecting said metered samples of unknown gas into a carrier gas stream, single detector means, single recorder means operatively connected to said detector means, means for directing said carrier gas stream containing a sample of unknown gas continuously through said adsorption column and said molecular sieve column to said detector means, means for bypassing said molecular sieve column and directing said carrier gas stream containing components of unknown gas directly from said adsorption column to said detector means, and means for directing said carrier gas stream containing another sample of said unknown gas through said liquid phase partition column directly to said detector means, in which the means for passing the carrier gas through said columns includes two-gang four-way valve means and two-gang three-way valve means, one of said two-gang four-way valve means being interconnected with said carrier gas stream from said sample measuring means, being interconnected with one side of said adsorption column, being interconnected to atmosphere and being interconnected to one side of said liquid phase partition column, the other of said two-gang four-way valve means being connected at one side to one of said two-gang three-way valve means, being connected to carrier gas flow for backflushing, being connected to the other side of the liquid phase partition column and being connected to said detector means, said one of said two-gang three-way valve means being also connected at one side to said molecular sieve column and being connected at another side to the other of said two-gang three-way valve means, and the other of said two-gang three-way valve means being connected at one side to the opposite side of said molecular sieve-column and to the opposite side of said adsorption column.

24. In mechanism for gas chromatography, an adsorption column, a molecular sieve column and a liquid phase partition column, means for metering samples of unknown gas, means for injecting said metered samples of unknown gas into a carrier gas stream, a single detector, a single electric recorder operatively connected to the detector, first, second, third and fourth multiport valve means, conduit means connecting in sequence the metering means, said first valve means, said adsorption column, said second valve means, said molecular sieve column, said third valve means, said fourth valve means and said detector means, whereby the carrier gas stream containing a measured sample of unknown gas may selectively be directed through the adsorption column and then through the molecular sieve column to the detector, thereby recording peaks corresponding to fixed gas components of the unknown sample on a single trace on the recorder, said second and third valve means being interconnected by bypass conduit means and being selectively operable for bypassing said molecular sieve column, whereby said carrier gas stream containing components of unknown gas may selectively be directed from said adsorption column directly to said detector means thereby producing peaks on the single trace of the recorder corresponding to ethane, carbon dioxide and ethylene present in the unknown sample, conduit means connecting in sequence said first valve means, said liquid phase partition column and said fourth valve means, said first valve means being operable to switch the flow of carrier gas containing components of unknown gas to said liquid phase partition column instead of to said adsorption column, and said foruth valve means being operable to provide flow of carrier gas containing components of unknown gas to said detector from said liquid phase partition column instead of from said third valve means, whereby said carrier gas containing a second measured sample of unknown gas may selecetively be directed from said metering means directly through said liquid phase partition column to said detector means thereby producing single recorder trace peaks corresponding to carbon dioxide and higher hydrocarbons present in the unknown sample.

25. A device of claim 24, in combination with means for backflushing the liquid phase partition column while the sample gas stream containing unknown gas components is passing through the adsorption column, and means for backflushing the molecular sieve column and the adsorption column in series in that order by the carrier gas while the carrier gas stream containing the second sample of unknown gas is passing through the liquid phase partition column.

26. A device of claim 24, in which the liquid phase partition column includes particles of inert material which in some cases have adsorbed 2,4-dimethyl thiophan sulfone and in some cases have adsorbed a di-alkyl ester of an aliphatic dibasic acid which ester contains between 12 and 42 carbon atoms.

27. A device of claim 26, in which the relative volumes of the inert particles having the sulfone and the ester in the column are at 35 to 15.

28. In mechanism for gas chromatography, a sample valve having a rotor valve element, shaft means mounting the rotor, said rotor valve element having a plurality of measured chambers, having a housing surrounding said chambers and provided with a first pair of cooperating ports which in one position of the rotor valve element connect with one of the chambers and in another position of the rotor valve element connect with another of said chambers, and provided with a second pair of ports which in one position of the rotor valve element connect with one of the chambers and in another position of the rotor valve element connect with another chamber, said chambers and said pairs of ports being so related that the chambers may be positioned so that any of the chambers may selectively connect with said first and said second pairs of ports, snap acting means for abruptly rotating the rotor valve element, comprising a torque motor urging the rotor valve element to rotate from one position to another, ratchet means for restraining and releasing the shaft means at a predetermined time and permitting motion through a predetermined portion of a rotation, detent means engaging the ratchet, solenoid means energizing the detent means to release the same, an electric circuit connected to said solenoid means, and switch means including actuating means for closing said electric circuit for a time interval less than the time of rotation of said ratchet to the next tooth.

29. A device of claim 28, in which said switch actuating means for closing said electric circuit includes a cam operated switch actuated by inertial overtravel of a resilient weighted member.

30. In a recording mechanism, means for generating an electrical impulse to be recorded, a recorder operatively connected to said means for generating the impulse, sensitivity adjusting means interposed in circuit between the impulse generating means and the recorder, step switch means operatively connecting a particularly sensitively level of said sensitivity adjusting means to the recorder, first switch means responding to the attainment of a particular proportion of full scale indication on the recorder, circuit means operatively connected to said first switch means to advance said step switch one step each time said first switch means operates, timer means, second switch means responding to said timer means, electrically operated ratchet means having capability of being advanced a predetermined number of steps, circuit means operatively connecting said ratchet means to said second switch means, and advancing said ratchet means for said predetermined number of steps at a particular time on the timer means, and circuit means also operatively connected to said second switch means for advancing said step switch the same number of steps as said ratchet means advances, whereby at said time the sensitivity of the recorder is reduced to a predetermined value without operation of the means for adjusting said sensitivity change means.

31. A device of claim 30, in combination with third switch means operatively associated with said ratchet means for disconnecting said ratchet means when it advances the predetermined number of steps.

32. A device of claim 31, in combination with means for resetting said step at the attainment of a new time on said timer.

33. A device of claim 30, in which a plurality of ratchet means are provided capable of having different settings, in combination with second step switch means interposed between said second switch and said ratchet means, selecting and rendering operative a different ratchet means for each step in advance of said second step switch means.

34. In mechanism for gas chromatography, means for directing a carrier gas stream, means for measuring a sample of unknown gas and injecting the same into the carrier gas stream, column means for separating components of said unknown sample in the carrier gas stream, detector means responding to separated gas components in the carrier gas stream and generating an electrical impulse responsive to said gas components, recorder sensitivity changing means connected to said detector means and connected also to the recorder, switch means on the recorder responsive to the attainment by the recorder of a predetermined proportion of full scale indication, timer controlled switch means, a plurality of ratchet selector devices adapted to be preset each to a desired number of steps, means responsive to said timer controlled switch means for selecting a particular ratchet device for operation and energizing said selected ratchet device, means responsive to said selected ratchet device for operating said sensitivity changing means through a plurality of steps corresponding to the steps of operation of said selected ratchet device, and means responsive to said recorder actuated switch means first mentioned for actuating said sensitivity changing device responsive to attainment of a predetermined proportion of full scale indication of said recorder.

35. A device of claim 34, in combination with means operated by said timer controlled switch means for automatically re-setting said sensitivity changing means and said ratchet means.

36. In a mechanism for gas chromatography, means for directing a carrier gas stream, means for measuring a sample of unknown gas and injecting the same into the carrier gas stream, column means for separating components of said unknown sample in the carrier gas stream, detector means responding to separated gas components in the carrier gas stream and generating an electrical impulse responsive to said gas components, a recorder operatively connected to said detector means, recorder sensitivity changing means connected to said detector means and connected also to the recorder, switch means on the recorder responsive to the attainment by the recorder of a predetermined proportion of full-scale indication, timer operated electric switch means, component selector switch means operatively connected to said timer switch means to advance step-by-step with successive time intervals, a plurality of sensitivity preset control means, each of which is operatively connected to said component selector switch means, and each of which is selectively operatively connected to said sensitivity changing means, means operatively connecting said first mentioned switch means to said sensitivity changing means, said column means separating said unknown gas into separate components which arrive at said detector means at different times, said recorder plotting a single trace on a single chart in response to said detector, said timer controlled switch means setting said component selector switch means to a different setting prior to the arrival at the detector means of the next component gas and maintaining said component selector switch means at the same setting throughout the period during which a particular component gas passes through the detector means and then shifting said component selector switch means to a new setting, in combination with means operated by said timer controlled switch means for re-setting said sensitivity changing means to maximum sensitivity prior to actuating said component selector switch means for the next position.

37. A device of claim 36, in combination with means actuated by said component selector switch means for re-setting all said sensitivity preset-control means at a predetermined time.

38. In mechanism for gas chromatography, means for directing a carrier gas stream, means for measuring a sample of unknown gas and injecting the same into the carrier gas stream, column means for separating components of said unknown sample in the carrier gas stream, detector means responding to separated gas components in the carrier gas stream and generating an electrical impulse responsive to said gas components, recorder sensitivity changing means connected to said detector means and connected also to the recorder, switch means on the recorder responsive to the attainment by the recorder of a predetermined proportion of full scale indication, step-wise operating mechanism responsive to operation of said switch means for changing the sensitivity setting of said sensitivity changing means step-by-step, one step at a time for each actuation of said switch means, and means operating after the setting of the final sensitivity change for a particular gas component for recording on the recorder chart in adjacent relation to the trailing end of the hump of the recorder trace for said particular component a marking identifying the sensitivity at which that portion of the trace was produced.

39. In a device for gas chromatography, carrier gas conduit means, a sample metering and injecting valve, a sample container, conduit means interconnecting the sample container to one side of the sample metering and injecting valve, an electrically operated sample flow control valve interposed in said conduit means between said sample container and said sample metering and injecting valve, an adsorption column, a molecular sieve column, a liquid phase partition column, electrically operated column selector valve means interconnected with said carrier gas stream and said sample metering and injecting valve for placing said adsorption column and said molecular sieve column in series onstream with said liquid phase partition column on backflush, then placing said adsorption column alone onstream with said liquid phase partition column on backflush, and then placing said liquid phase partion column onstream with said molecular sieve column and said adsorption column in series in that order on backflush, detector means operatively connected through said selector valve means to the particular column or columns which are onstream, so that the unknown gas sample in the carrier gas stream is separated into different components which arrive at the detector means at different times and including a Wheatstone bridge circuit having an output circuit, a recorder, sensitivity changing means and a sensitivity step switch operatively interposed between said output circuit and said recorder, a timer, a timer operated sample valve switch, electric circuit means operatively connecting said timer operated sample valve switch to said electrically operated metering and injecting valve for operation at times controlled by the timer, timer operated column selector switch means, circuit means operatively connecting said column selector switch means to said electrically operated column selector valve means to place the columns onstream and in backflush in the order previously named at predetermined times determined by the timer, a sample flow control switch operated by the timer, circuit means operatively connecting said electrically operated sample flow control valve to said sample flow control switch for operation at different times as controlled by the timer, and a timer operated sensitivity control means for adjusting said recorder sensitivity step switch at predetermined times prior to each peak on the recorder corresponding to a particular gas sample component.

40. A device of claim 39, in which the timer operated sensitivity control means comprises timer operated switch means, component selector sensitivity control means operated at predetermined times by said timer operated switch means, a plurality of preset control means individually selected and energized for presetting the sensitivity of said recorder through said component selector sensitivity control means, and means operatively connecting a particular preset control means which is operating at a given time to said recorder sensitivity step switch for changing the setting of said recorder sensitivity step switch preliminary to the arrival at the detector of a gaseous component for which the sensitivity of the recorder has been preset.

41. A device of claim 40, in combination with recorder scale switch means responsive to the attainment of an indication on the recorder which is a predetermined proportion of full scale indication, and means controlled by said recorder scale switch means for operating said recorder sensitivity step switch independently of operation by said preset control means.

42. A device of claim 41, in combination with manual control means for setting of all of said timer operated switch means in unison.

43. The method of gas chromatography for detecting concentrations of gas components of an unknown gas which includes fixed gases, carbon dioxide and higher hydrocarbons, using separating column means including an adsorption column, a molecular sieve column and a liquid phase partition column and also using a detector and recorder, which method comprises measuring said unknown gas to produce required sampling, injecting said unknown gas after sampling into a carrier gas, first passing said carrier gas including one sample of said unknown gas through the adsorption column and the molecular sieve column in series directly to the detector, then at a predetermined time corresponding to the time for completion of passage of said fixed gases components through said molecular sieve column, passing said carrier gas including said carbon dioxide and certain of the higher hydrocarbon components from the adsorption column directly to the detector, then passing said carrier gas including another sample of said unknown gas directly through the liquid phase partition column to the detector, and recording the indications of said detector on a recorder and plotting a single recorder trace for the various components.

44. In the method of gas chromatography, which comprises measuring unknown gas sampling, injecting the gas sampling into a carrier gas, separating components of the unknown gas sampling in the carrier gas so that they will arrive at a point in the gas stream at spaced time intervals, and detecting the arrival of gas sampling components in a detector having a thermal conductivity cell in the carrier gas stream by variation in an electric bridge circuit, the invention which comprises establishing zero current in the bridge output circuit for a stabilized unbalanced condition of the bridge and a stabilized current in the thermal conductivity cell with the gas stream through the detector consisting only of carrier gas by introducing into the bridge output circuit a zero-correcting E.M.F., comprising the steps of providing an adjustable counter E.M.F. in series with said output circuit, opening the output circuit, measuring the voltage across the point of opening of said output circuit, adjusting the counter E.M.F until the voltage reading across the open point in the output circuit is zero and then closing the output circuit at the point of opening, all of said operations being performed without causing any change in said stabilized current in the thermal conductivity cell.

References Cited by the Examiner

UNITED STATES PATENTS

| | | | |
|---|---|---|---|
| 1,101,568 | 6/14 | Roberts | 73—421 X |
| 2,565,230 | 8/51 | Hebler | 73—27 |
| 2,661,260 | 12/53 | Salzman | 346—65 |
| 2,673,136 | 5/54 | Stein et al. | 346—65 X |
| 2,830,738 | 4/58 | Sorg et al. | 73—23.1 |
| 2,833,151 | 5/58 | Harvey | 73—23 X |
| 2,846,121 | 8/58 | Ronnebeck | 73—23 X |
| 2,875,606 | 4/49 | Robinson | 55—197 X |
| 2,909,241 | 10/59 | Rummert | 55—64 X |
| 2,910,139 | 10/59 | Matyea | 55—31 X |
| 2,981,092 | 4/61 | Marks | 73—23 |
| 2,982,123 | 5/61 | Kindred | 73—23 |
| 2,992,703 | 7/61 | Vesan et al. | 55—62 |
| 2,995,410 | 8/61 | McDonnell et al. | 73—23 |
| 3,023,605 | 4/62 | Burk | 73—23 |
| 3,097,518 | 7/63 | Taylor et al. | 73—23.1 |
| 3,101,606 | 8/63 | Roof | 73—23.1 |
| 3,112,639 | 12/63 | Maxwell | 73—23.1 |
| 3,121,321 | 2/64 | Karasek | 73—23.1 |

FOREIGN PATENTS

| | | |
|---|---|---|
| 1,221,186 | 1/60 | France. |
| 850,608 | 10/60 | Great Britain. |
| 873,950 | 8/61 | Great Britain. |

OTHER REFERENCES

Article: Baker et al. in Control Engr'g, January 1961, pages 77–81.

Book-Gas Chromatography, Scott, Edinburgh, 1960 symposium, June 8–10, 1960 (preprint copies), pages 412–421 of paper by Boreham, Marhoff.

Articles by J. J. Madison published in Analytical Chemistry, vol. 30, No. 11, November 1, 1958, pages 1859–1862.

D. H. Lichtenfels: Published in Analytical Chemistry, vol. 28, No. 9, September 1956, pages 1376–1379.

Paper: Harrison, published in Vapor Phase Chromatography by Desty, London, 1956, pages 338, 339.

Article: Darling et al., published in Analytical Chemistry, vol. 32, No. 1, January 1960, page 144.

RICHARD C. QUEISSER, *Primary Examiner.*